US012786854B2

(12) United States Patent
Lei

(10) Patent No.: US 12,786,854 B2
(45) Date of Patent: Nov. 3, 2026

(54) MONITORING SYSTEM INFORMATION CHANGE INDICATION

(71) Applicant: QUALCOMM Incorporated, San Diego, CA (US)

(72) Inventor: Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 294 days.

(21) Appl. No.: 18/628,520

(22) Filed: Apr. 5, 2024

(65) Prior Publication Data

US 2024/0397409 A1 Nov. 28, 2024

Related U.S. Application Data

(60) Provisional application No. 63/503,878, filed on May 23, 2023.

(51) Int. Cl.

*H04W 48/12* (2009.01)
*H04L 5/00* (2006.01)
*H04W 68/02* (2009.01)

(52) U.S. Cl.

CPC ........... *H04W 48/12* (2013.01); *H04L 5/0094* (2013.01); *H04W 68/02* (2013.01)

(58) Field of Classification Search

CPC ..... H04W 48/12; H04W 68/02; H04W 76/27; H04W 48/16; H04W 52/0225;

(Continued)

(56) References Cited

U.S. PATENT DOCUMENTS

2023/0199812 A1* 6/2023 Lei .......................... H04L 5/001 370/329
2024/0049182 A1* 2/2024 Zhou ....................... H04L 5/001

(Continued)

FOREIGN PATENT DOCUMENTS

WO WO-2022152427 A1 * 7/2022 ........ H04W 52/0229

OTHER PUBLICATIONS

Ericsson: "Clarification on Presence of Coreset0 for PSCell", 3GPP TSG-RAN WG2 Meeting #122, R2-2306001, 3rd Generation Partnership Project, Mobile Competence Centre, 650, Route Des Lucioles, F-06921 Sophia-Antipolis Cedex, France, vol. RAN WG2, No. Incheon, South Korea, May 22, 2023-May 26, 2023, May 12, 2023, pp. 1-6, XP052390759, chapter 6.3.2.

(Continued)

*Primary Examiner* — Abdullahi Ahmed
(74) *Attorney, Agent, or Firm* — Procopio, Cory, Hargreaves & Savitch LLP

(57) ABSTRACT

Apparatus, methods, and computer program products for monitoring system information change are provided. An example method may include receiving, from a network entity, a configuration for an initial downlink (DL) bandwidth part (BWP) associated with a small data transmission (SDT) procedure, where a synchronization signal block (SSB) is configured to be transmitted in the initial DL BWP associated with the SDT procedure. The example method may further include receiving, from the network entity, a paging early indication (PEI) that indicates no paging physical downlink control channel (PDCCH) is scheduled for a first paging occasion (PO) or a first PO group. The example method may further include skipping monitoring for a system information change indication in the first PO or the first PO group in response to reception of the PEI.

20 Claims, 12 Drawing Sheets

(58) Field of Classification Search
CPC ......................... H04W 68/005; H04W 68/025; H04L 5/0094; H04L 5/001; H04L 5/0053
See application file for complete search history.

(56) References Cited

U.S. PATENT DOCUMENTS

| | | | | |
|---|---|---|---|---|
| 2024/0089919 | A1* | 3/2024 | Fu | H04W 68/025 |
| 2024/0155580 | A1* | 5/2024 | Wang | H04W 72/0453 |
| 2024/0196413 | A1* | 6/2024 | Chatterjee | H04L 5/0053 |

OTHER PUBLICATIONS

Ericsson: "Design of Paging Enhancements", 3GPP TSG RAN WG1 #107-e, R1-2112149, 3rd Generation Partnership Project, Mobile Competence Centre, 650, Route Des Lucioles, F-06921 Sophia-Antipolis Cedex, France, vol. RAN WG1, No. e-Meeting, Nov. 11, 2021-Nov. 19, 2021, Nov. 6, 2021, 13 Pages, XP052075276, chapters 1, 2.

Gaal P (Qualcomm Incorporated)., et al., "Remaining Issues on UE Complexity Reduction", 3GPP TSG RAN WG1 Meeting #112, R1-2301387, Type Discussion, NR_REDCAP-CORE, 3rd Generation Partnership Project, Mobile Competence Centre, 650, Route Des Lucioles, F-06921 Sophia-Antipolis Cedex, France, vol. 3GPP RAN 1, No. Athens, GR, Feb. 27, 2023-Mar. 3, 2023, Feb. 17, 2023, 9 Pages, XP052248522, chapters 1-4.

International Search Report and Written Opinion—PCT/US2024/023615—ISA/EPO—Jul. 10, 2024.

Qualcomm Incorporated: "BW Reduction for RedCap UE", 3GPP TSG-RAN WG1 Meeting #106bis-e, R1-2110193, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 2, 2021, 28 Pages, XP052059129, chapters 1, 2.

3GPP TS 38.213: "3rd Generation Partnership Project, Technical Specification Group Radio Access Network, NR, Physical Layer Procedures for Control (Release 17)", 3GPP TS 38.213, V17.5.0, Mar. 2023, pp. 1-262.

3GPP TS 38.331: "3rd Generation Partnership Project, Technical Specification Group Radio Access Network, NR, Radio Resource Control (RRC) Protocol Specification (Release 17)", 3GPP TS 38.331, V17.4.0, Mar. 2023, 1321 Pages, Sections 5.2.2.2.2, 5.3.8.3, 5.3.8.4, 6.2.2, 7.1.1.

Qualcomm Incorporated: "Paging Enhancements for Idle/Inactive UE Power Saving", 3GPP TSG-RAN WG1 #105-e, R1-2104682, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, May 12, 2021, 16 Pages, XP052010933, Sections 1-4.

ZTE Corporation: "New WI: Mobile Terminated-Small Data Transmission (MT-SDT) for NR", 3GPP TSG RAN Meeting #94e, RP-213583, Electronic Meeting, Dec. 6-17, 2021, 5 pages.

* cited by examiner

MONITORING SYSTEM INFORMATION CHANGE INDICATION

CROSS REFERENCE TO RELATED APPLICATION(S)

This application claims the benefit of and priority to U.S. Provisional Application Ser. No. 63/503,878, entitled "MONITORING SYSTEM INFORMATION CHANGE INDICATION" and filed on May 23, 2023, which is expressly incorporated by reference herein in its entirety.

TECHNICAL FIELD

The present disclosure relates generally to communication systems, and more particularly, to wireless communication systems with system information (SI) change indication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include at least one memory and at least one processor coupled to the at least one memory. Based at least in part on stored information that is stored in the at least one memory, the at least one processor is configured to cause the apparatus to receive, from a network entity, a configuration for an initial downlink (DL) bandwidth part (BWP) associated with a small data transmission (SDT) procedure, where a synchronization signal block (SSB) is configured to be transmitted in the initial DL BWP associated with the SDT procedure. Based at least in part on stored information that is stored in the at least one memory, the at least one processor is configured to cause the apparatus to receive, from the network entity, a paging early indication (PEI) that indicates no paging physical downlink control channel (PDCCH) is scheduled for a first paging occasion (PO) or a first PO group. Based at least in part on stored information that is stored in the at least one memory, the at least one processor is configured to cause the apparatus to skip monitoring for a system information change indication in the first PO or the first PO group in response to reception of the PEI.

In another aspect of the disclosure, a method, a computer-readable medium, and an apparatus at a UE are provided. The apparatus may include at least one memory and at least one processor coupled to the at least one memory. Based at least in part on stored information that is stored in the at least one memory, the at least one processor is configured to cause the apparatus to receive, from a network entity, a configuration for an initial DL BWP associated with an SDT procedure, where a SSB is configured to be transmitted in the initial DL BWP associated with the SDT procedure. Based at least in part on stored information that is stored in the at least one memory, the at least one processor is configured to cause the apparatus to monitor for a system information change indication in a PO or a PO group based on a condition of a lack of support for reception of an associated PEI or an absence of PEI resources in the configuration for the initial DL BWP.

To the accomplishment of the foregoing and related ends, the one or more aspects include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
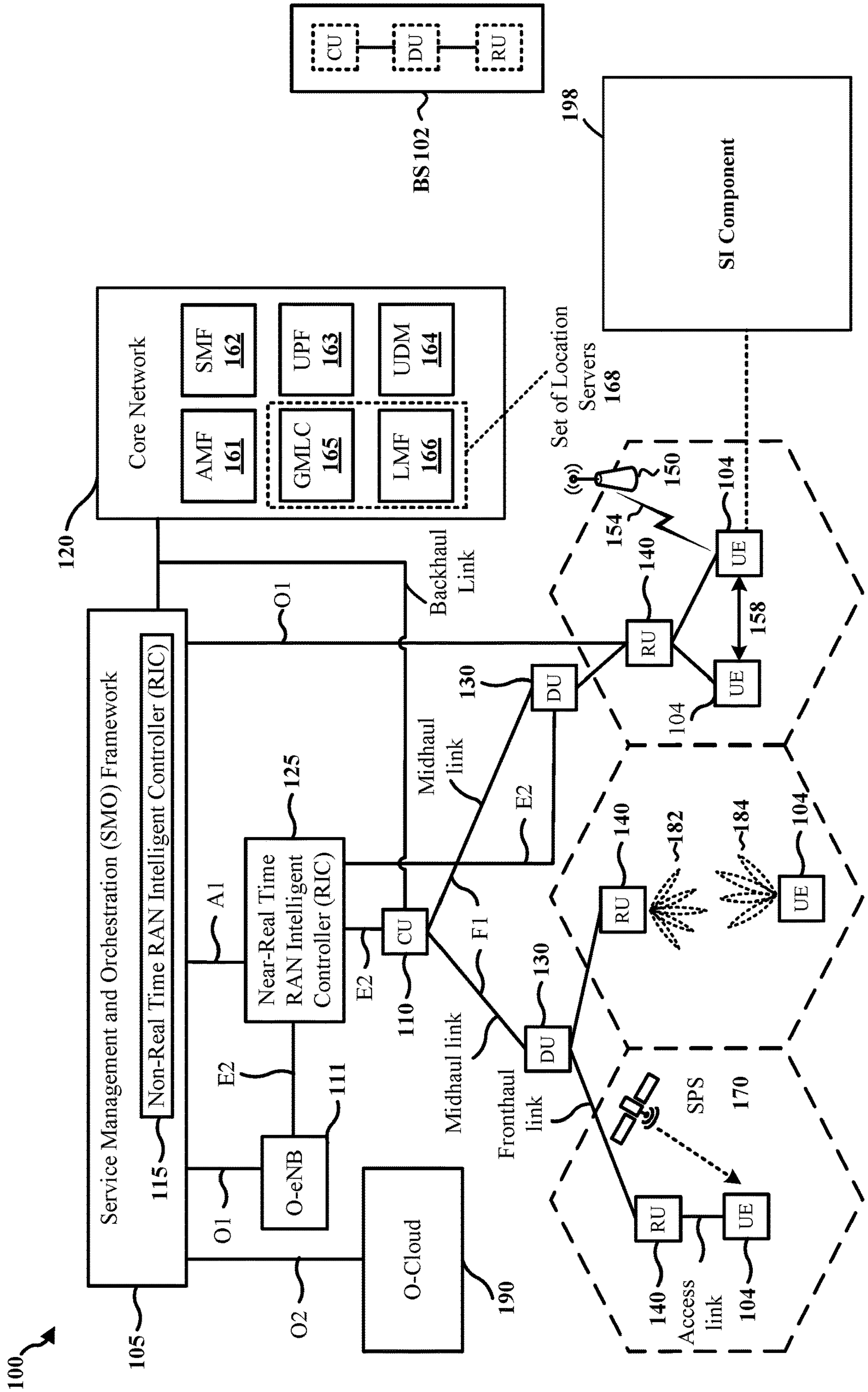
FIG. 1 is a diagram illustrating an example of a wireless communications system and an access network.

A UE monitors for system information (SI) updates from a network. The UE may monitor for the SI updates based on an RRC state of the UE. For example, a UE in an RRC idle or RRC inactive state may monitor for an SI change indication in the UE's paging occasion (PO) every DRX cycle. A UE in the RRC idle or RRC inactive state while an SDT procedure is ongoing may monitor for an SR change indication in any PO at least once per modification period. Aspects presented herein enable a UE to achieve greater power savings by skipping monitoring for SI change indications in a PO in response to receiving a PEI that indicates no paging PDCCH is scheduled for the PO or a first PO group. Aspects presented herein provide for monitoring for a system information change indications in a PO or a PO group for UEs that do not support reception of an associated PEI to or when a UE does not have a configuration of PEI resources in an initial DL BWP.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHz-114.25 GHZ), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a SI component 198. In some aspects, the SI component 198 may be configured to receive, from a network entity, a configuration for an initial DL BWP associated with an SDT procedure, where a SSB is configured to be transmitted in the initial DL BWP associated with the SDT procedure. In some aspects, the SI component 198 may be further configured to receive, from the network entity, a PEI that indicates no paging PDCCH is scheduled for a first PO or a first PO group. In some aspects, the SI component 198 may be further configured to skip monitoring for a system information change indication in the first PO or the first PO group in response to reception of the PEI.

In some aspects, the SI component 198 may be configured to receive, from a network entity, a configuration for an initial DL BWP associated with an SDT procedure, where a SSB is configured to be transmitted in the initial DL BWP associated with the SDT procedure. In some aspects, the SI component 198 may be further configured to monitor for a system information change indication in a PO or a PO group based on a condition of a lack of support for reception of an associated PEI or an absence of PEI resources in the configuration for the initial DL BWP.

Although the following description may be focused on 5G NR, the concepts described herein may be applicable to other similar areas, such as LTE, LTE-A, CDMA, GSM, and other wireless technologies.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figure 2A:
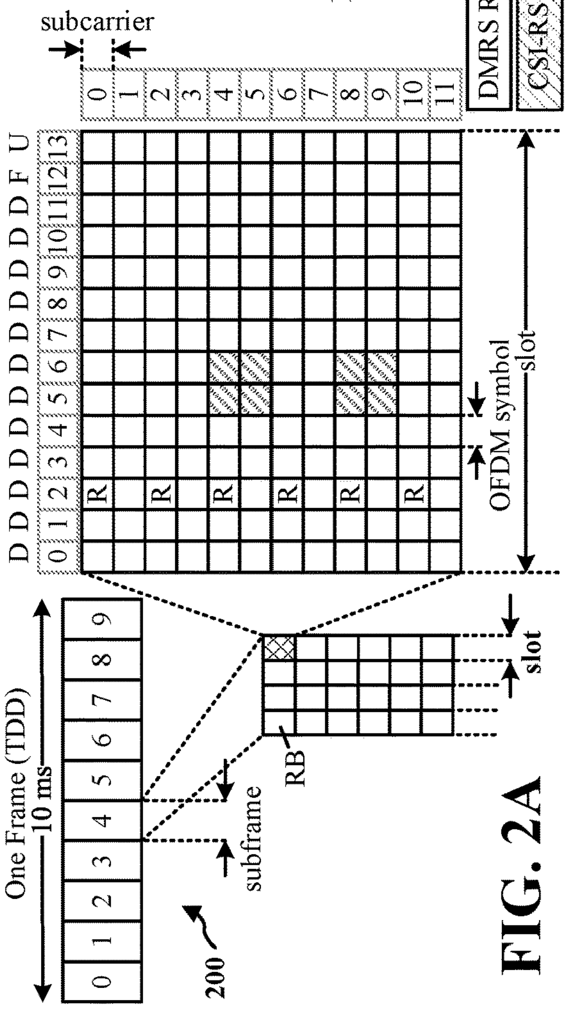
FIG. 2A is a diagram illustrating an example of a first frame, in accordance with various aspects of the present disclosure.
Figure 2B:
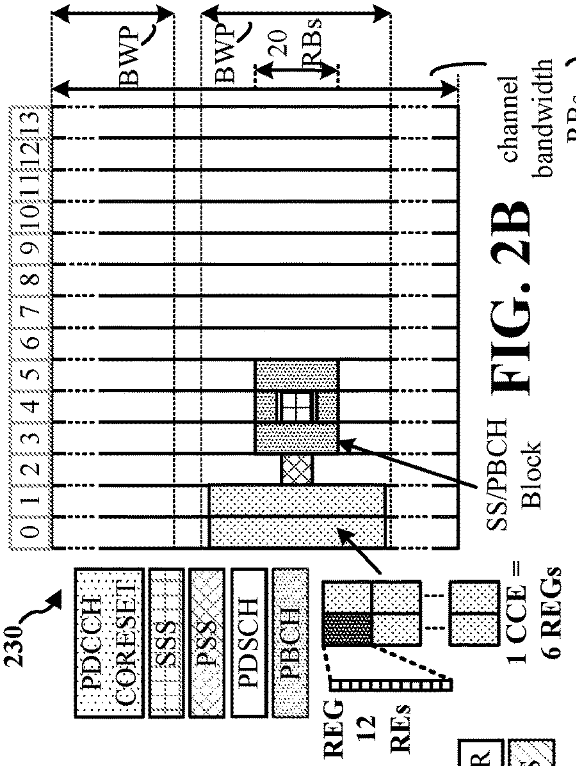
FIG. 2B is a diagram illustrating an example of downlink (DL) channels within a subframe, in accordance with various aspects of the present disclosure.
Figure 2C:
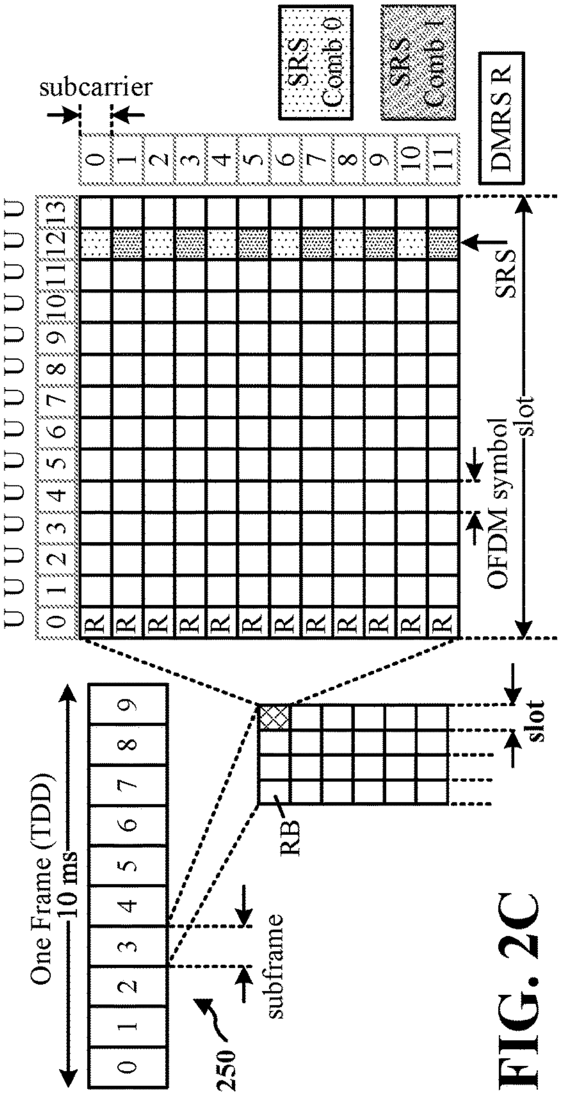
FIG. 2C is a diagram illustrating an example of a second frame, in accordance with various aspects of the present disclosure.
Figure 2D:
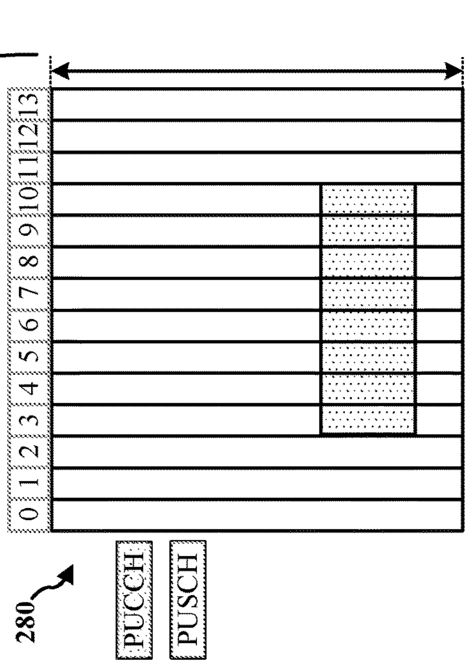
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in some aspects. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
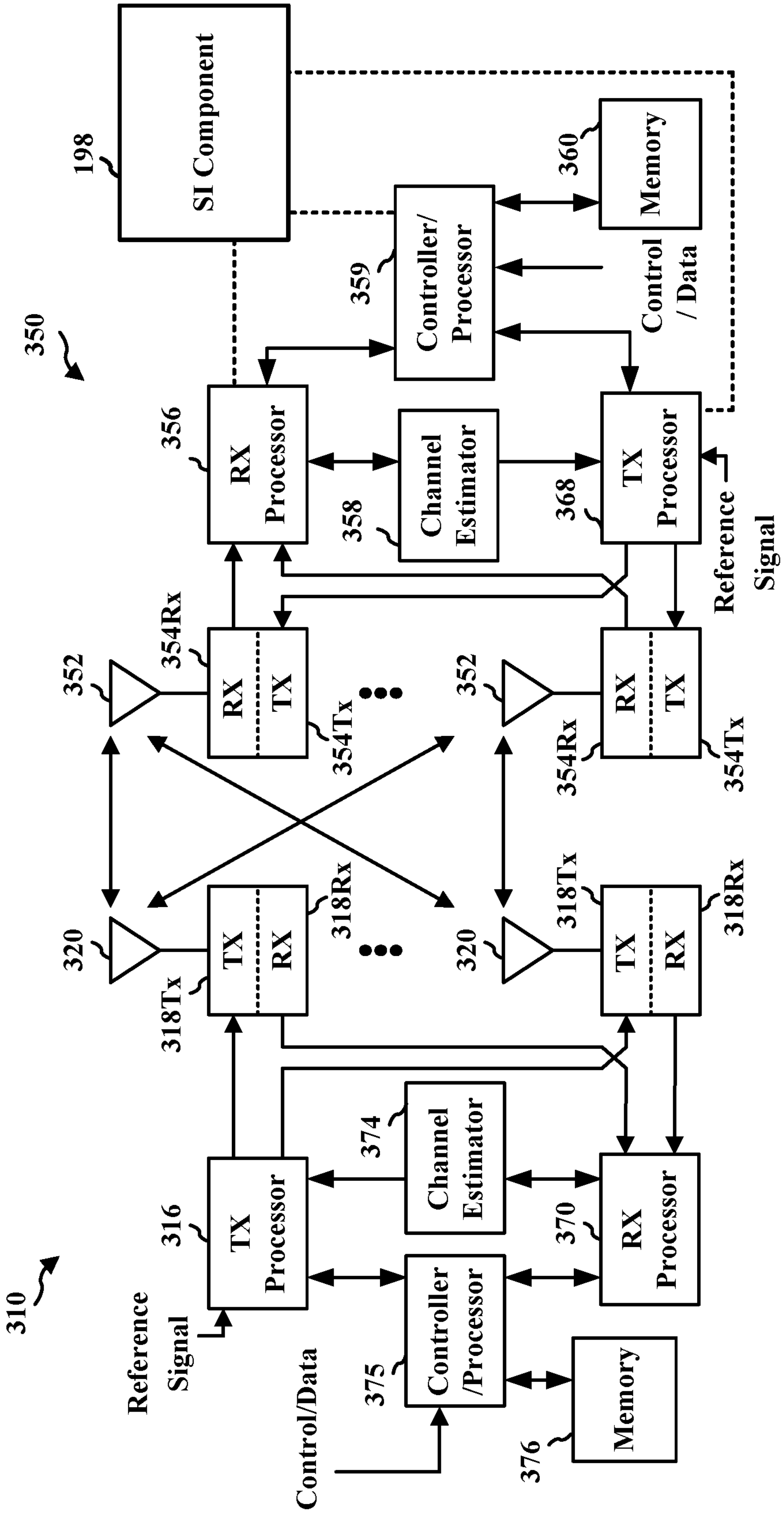
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (iFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with SI component 198 of FIG. 1.

In some wireless communication systems, an RRC protocol may be used on the air interface. Functions of the RRC protocol may include connection establishment and release functions, broadcast of system information, radio bearer establishment, reconfiguration and release, RRC connection mobility procedures, paging notification and release and outer loop power control, among other aspects. The RRC protocol may configure user and control planes according to the network status and may allow for radio resource management strategies to be implemented. Some example services and functions of an RRC layer/sublayer may include broadcast of system information related to access stratum (AS) or non-access stratum (NAS), paging, establishment and release of an RRC connection between a UE and a radio access network (RAN), establishment and release of signaling radio bearers (SRBs) or data radio bearers (DRBs), mobility functions, or the like. Operations of the RRC may be based on specific states that a UE may be in. In some wireless communication systems, a UE may be in an RRC idle state, an RRC inactive state, or an RRC active state.

The UE may enter an RRC idle state after powering up and before establishing an RRC connection. The UE may also enter the RRC idle state after a connection failure or an RRC release in the RRC connected state or the RRC inactive state. In the RRC idle state, a UE may be able to perform or process public land mobile network (PLMN) selection, broadcast of system information (SI), cell reselection mobility, paging for mobile terminated (MT) data, or discontinuous reception (DRX) for core network paging (CN) configured by NAS. In the RRC inactive state, the UE may be able to perform or process broadcast of SI, cell reselection mobility, RAN paging, RAN based notification area (RNA), DRX for RAN paging, RAN connections in control or user plane, or the like. In the RRC inactive state, the UE's AS context may be stored in RAN and the UE and the RAN may be aware of an RNA in which the UE belongs to. In the RRC connected mode, in addition to being able to perform or process RAN connections, the UE may also transmit or receive unicast data from the RAN and network controlled mobility including measurements may also be processed or performed.

In the RRC inactive state, a UE may identify small amounts of UL data for transmission that may be infrequent or unexpected (e.g., data related to instant messaging services, push notifications, or wearable devices). To transmit the UL data, a UE may perform a random access channel (RACH) procedure and establish an RRC connection with the network and enter an RRC connected state. However, performing a RACH procedure and establishing an RRC connection for small amounts of data may be inefficient in view of the larger signaling overhead compared with the smaller amount of data to be transmitted. Therefore, in some wireless communication systems, a UE in an RRC inactive state may be able to use an SDT procedure to transmit data of volume below a threshold without transitioning to or entering an RRC connected state, e.g., while remaining in the RRC inactive state.

Based on the SDT procedure, the network may allow the UE to transmit (MO) uplink small data in an RRC inactive state without the UE switching from the RRC inactive state to an RRC connected state. An SDT procedure may be RACH based or configured grant (CG) based. A RACH based SDT procedure (which may also be called RA-SDT) may enable UL small data transmissions for RACH-based schemes (such as 2-step and 4-step RACH). A CG based SDT procedure (which may also be called CG-SDT) may enable transmission of UL data on configured PUSCH resources (such as by reusing the configured grant type 1). A network node may schedule a type 1 CG by transmitting an RRC to the UE that schedules the UE to transmit a PUSCH without first receiving a lower layer trigger (e.g., a DCI trigger) from the network node. Such a PUSCH may also be referred to as a type 1 CG. A network node may schedule a type 2 CG by transmitting an RRC to the UE that schedules the UE to transmit a PUSCH in response to receiving a simple DCI without a PUSCH schedule (e.g., a configured scheduling (CS) radio network temporary identifier (CS-RNTI)). In response to receiving, for example, a DCI with a CS-RNTI, the UE may transmit the PUSCH as scheduled by the RRC. Such a PUSCH may also be referred to as a type 2 CG.

For SDT procedures, subsequent transmission of small data in UL and DL and the state transition decisions may be under network control. In some aspects, non-access stratum (NAS) message delivery may be enabled within an SDT procedure. For example, SRB1 and SRB2 may be configured for small data transmission in the RRC inactive state and transmission of NAS messages via SRB2 may be enabled.

It may be advantageous to improve the paging process to reduce unnecessary UE paging receptions. One of the techniques to reduce false (e.g., unnecessary) paging reception may be to separate UEs within a paging occasion (PO) into multiple groups. A PO may be a paging PDCCH monitoring occasion where paging PDCCH is transmitted in Type-2 PDCCH CSS Set, and its cyclic redundancy check (CRC) is scrambled by paging random network temporary identifier (P-RNTI). Absent grouping, all UEs within the PO may wake up during the PO to receive and decode the paging message even if the page is for a single UE. These groups (which may also be referred to as subgroups) may be referred herein as UE groups (or UE subgroups). Thus, with UE grouping, when the network transmits a paging indication to UEs in a PO, the network may indicate the group of UEs for which the page is intended, so that UEs in the PO but not being paged may not waste power in receiving and decoding the paging message.

The UEs in a PO may be grouped in various different ways. To reduce power consumption associated with a page reception, the UE attributes that may have an impact on power may be considered in the grouping of the UEs. Examples of the UE attributes that may have an impact on power may include the UE's paging probability (i.e., how likely the UE is to get a page), the UE's power state (e.g., plugged in vs. battery powered), among others. Because different types of UEs may exist in a cell, it may be challenging to find a single UE attribute for grouping the UEs that works well for all possible scenarios. The UE attributes that are utilized for UE grouping may be referred to as UE paging attributes, or simply paging attributes. According to aspects, UEs may provide their UE paging attributes to the network, and the network may decide how to group the UEs based on the UE paging attributes provided by the UEs.

In some aspects, the network may advertise a set of attributes that the network may use to group the UEs in a PO. The set of attributes may include one or more of the UE's paging probability (e.g., the probability or likelihood that the UE may get a page), the UE's power profile (e.g., a battery powered UE may be sensitive to power consumption in comparison to a UE that is plugged in may be insensitive, or less sensitive, to power consumption), the UE's RRC state (e.g., RRC Inactive or RRC Idle), or the UE's mobility (e.g., stationary or mobile). The network may use additional information the network may have about a UE (e.g., the UE's capabilities, such as the number of antennas, as UEs with fewer antennas may be associated with more repetitions), or information received from other network entities (e.g., the expected UE behavior information from the Application Function "AF"), in the UE grouping decision.

In some aspects, a UE may provide its information (e.g., an indication) about a selected set of the advertised UE paging attributes to the network. In some aspects, the UE may provide the indication of the UE paging attributes to the core network (in a particular example, to the AMF) by NAS signaling. In some aspects, the UE may provide the indication of the UE paging attributes to the RAN (in a particular example, to the base station) in a UE Assistance Information (UAI) message.

In some aspects, when or whether, if at all, to provide the UE paging attributes or which attributes to provide may be based on the UE implementation. In some aspects, the UE may provide its UE paging attributes to the network when the UE is in the RRC Connected state. For example, the UE may provide its UE paging attributes to the network when the UE enters the RRC Connected state due to a data transfer, a registration, or a tracking area update, etc. In some aspects, the UE may initiate an RRC connection to update the UE paging attributes. This may be useful when the UE paging attributes have changed significantly (e.g., when the power source of the UE has changed from plugged-in power to battery power, or the expected paging rate has increased, etc.). This may also be useful when a set of UE paging attributes advertised by the network have changed. In some aspects, the network may configure a prohibit timer to control how often the UE may report or update the UE paging attributes. The timer may start or reset when the UE submits a UE paging attributes report to the network. The UE may be prevented or prohibited from submitting another UE paging attributes report as long as the timer is still running (i.e., before the expiration of the timer), such that excessive UE paging attributes reporting may be avoided.

A PEI may be transmitted before an upcoming PO to a UE for indicating to the UE whether the UE may process (e.g., monitor for) the upcoming PO. The PEI may indicate UE subgroups that are being paged in the upcoming PO. UE power saving may be achieved if PEI and SSB are aligned in time. There may be one or more SSBs between the PEI and the PO associated with the PO for the UE to further update tracking loops for paging PDCCH decoding.

Figure 4B:
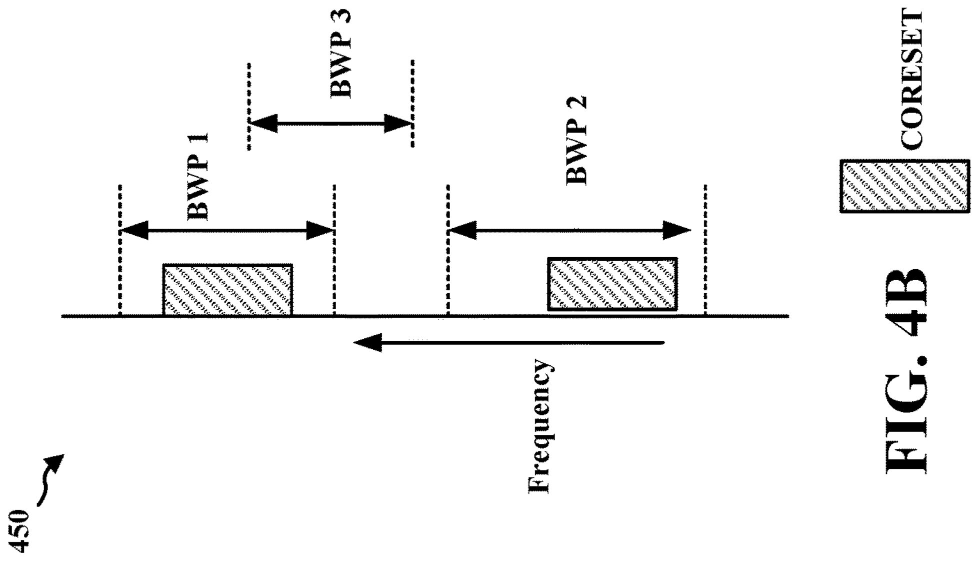
FIG. 4B illustrates an example of communication based on bandwidth parts (BWPs).
Figure 4A:
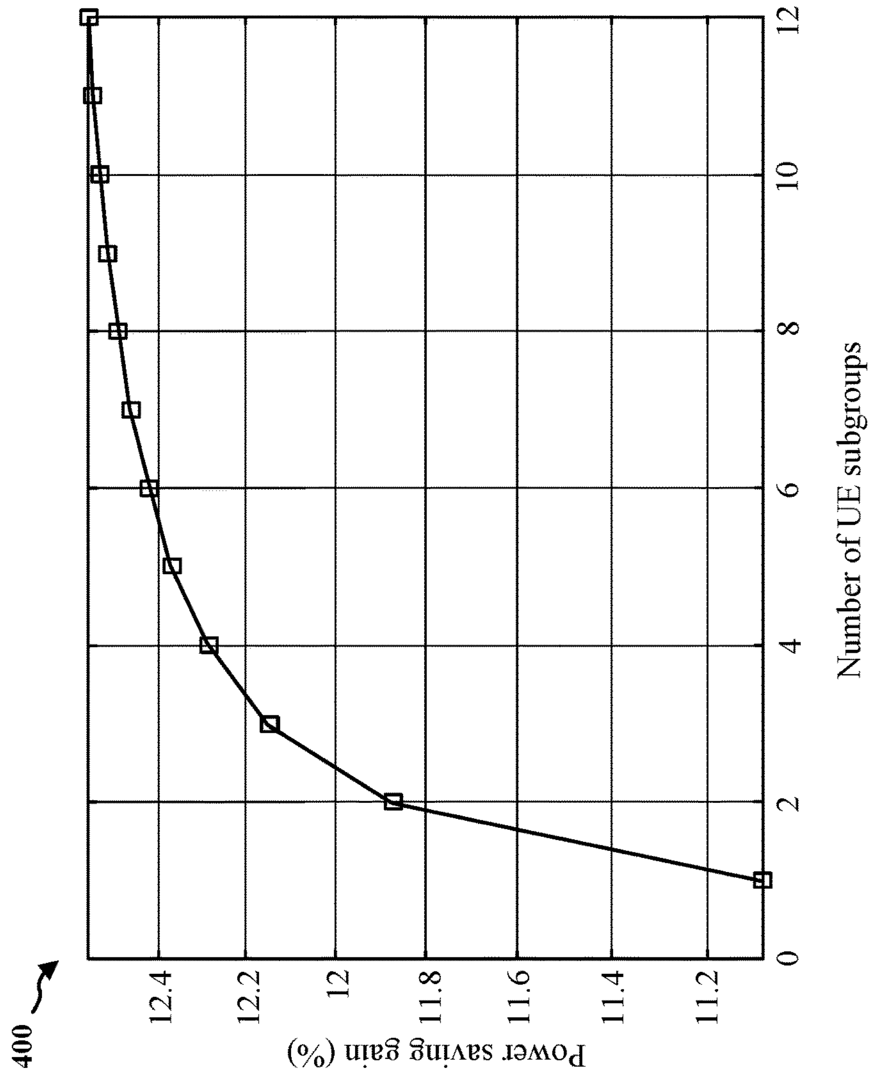
FIG. 4A is a diagram illustrating an example of power saving gains and number of UE subgroups for paging, in accordance with various aspects of the present disclosure.

FIG. 4A is a diagram 400 illustrating an example of an increase of power saving gains and number of UE subgroups for paging, in accordance with various aspects of the present disclosure. As illustrated in FIG. 4A, the power saving gain increases as the number of UE subgroups increase (such that each subgroup may include less UE). The example in FIG. 4A may be based on a 10% paging rate and a 20 ms SSB periodicity.

A UE may be configured with multiple BWPs. FIG. 4B illustrates an example 450 of three BWPs, e.g., BWP 1, BWP2, and BWP3, each spanning a set of frequency resources, e.g., a set of PRBs. A BWP may be activated for the UE from the set of configured BWPs. The UE may not be expected to receive PDSCH, PDCCH, CSI-RS, TRS, etc. outside of an active downlink BWP. The UE may not transmit PUSCH or PUCCH outside of an active uplink BWP. The UE may receive an indication from a network to switch from a first active BWP to a second active BWP from the set of configured BWPs. As illustrated in FIG. 4B, each downlink BWP may include a control resource set (CORESET) corresponds to a configurable set of physical resources in time and frequency that a UE uses to monitor for PDCCH/DCI when the corresponding BWP is activated. For example, if the UE receives an indication to switch to BWP 1 the UE may monitor for control signaling in the corresponding CORESET in BWP 1. If the UE receives an indication to switch to BWP 2, the UE may monitor for control signaling in the CORESET in BWP 2. A UE may receive a configuration for an initial BWP, e.g., an initial DL BWP and/or an initial UL BWP. The UE may receive, e.g., in the initial DL BWP, an indication for an active DL BWP and/or an active UL BWP to use for communication with a network.

Figure 5:
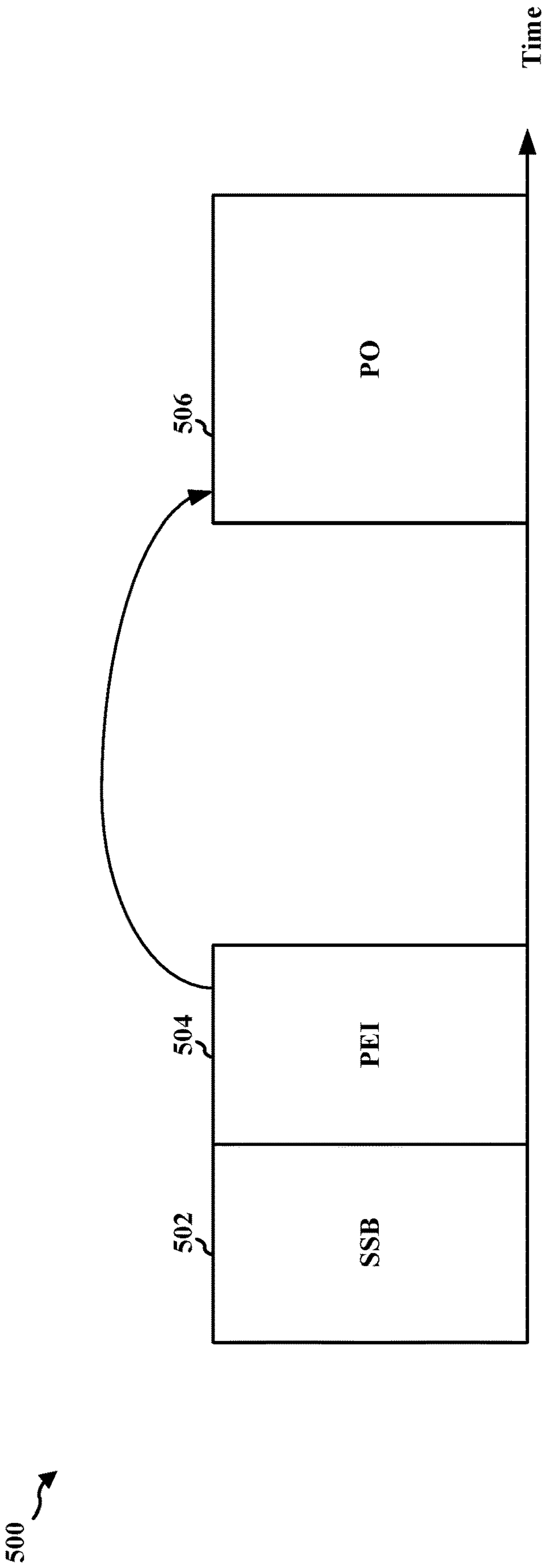
FIG. 5 is a diagram illustrating an example of SSB, PEI, and PO, in accordance with various aspects of the present disclosure.

FIG. 5 is a diagram 500 illustrating an example of SSB 502, PEI 504, and PO 506, in accordance with various aspects of the present disclosure. As illustrated in FIG. 5, the PEI 504 may include a UE subgroup indication (e.g., for indicating which UE subgroup may monitor) associated with the PO 506. The SSB 502 may be associated with the PO 506.

A UE may apply different SI acquisition procedures in different RRC states to acquire or reacquire the access stratum (AS), NAS and positioning data information. A UE in an inactive/idle states may have a valid version of the MIB, SIB1, SIB2, SIB3, SIB4 and SIB5. SIB1 may be carried by PDSCH and may carry all the information for UE to perform the initial attachment procedure at least up to resource set up and may carry scheduling information for other SIBs. SIBs other than SIB1 may be transmitted over PDSCH and transmitted by periodic broadcast. SIB2 may carry cell reselection information that may be common to intra-frequency, inter-frequency, or other types of cell reselection. SIB3 may carry intra-frequency neighbor cell list and reselection criteria. SIB4 may carry inter-frequency neighbor cell list and reselection criteria. SIB5 may carry neighbor cell list of other types and reselection criteria. A UE in an inactive/idle states may have a valid version of other SIBs (including positioning SIB) based on UE capability and network configuration. As an example, the UE may delete stored version of a SIB after a period of time, such as 3 hours, from the moment the SIB was successfully confirmed as valid. The network may update the SI message by broadcast in a SI modification period following a SI change indication. Boundaries of SI modification period are specified either by SFN mod m=0, or (H-SFN*1024+SFN) mod m=0, where m represents the periodicity of SI modification. The UE receives indications about SI modifications and/or PWS notifications using Short Message transmitted with P-RNTI over DCI. A short message may be a paging PDCCH indicating that the SI will be changed by NW in the next (in time) SI modification period. A short message may be based on DCI format 1_0. Repetitions of SI change indication may occur within a preceding SI modification period, or within a preceding discontinuous reception (DRX) acquisition period.

DCI format 0_0 may be a fallback format that may provide scheduling of a PUSCH in one cell. DCI format 0_1 may be a non-fallback format that may provide scheduling of a PUSCH in one cell. DCI format 1_0 may be a fallback DCI format used for allocating downlink resources for a PDSCH. DCI format 1_1 may be a non-fallback DCI format used for allocating downlink resources for a PDSCH. DCI format 2_0 may be used for the notification of slot format information (to dynamically change the slot format). DCI format 2_1 may be used for notifying the PRB(s) and OFDM symbol(s) where a UE may assume no transmission is intended for the UE. DCI format 2_2 may be used for the transmission of transmit power control (TPC) commands for a PUCCH and a PUSCH. DCI format 2_3 may be used for the transmission of a group of TPC commands for SRS transmissions by one or more UEs. DCI format 2_4 may be used for, such as dedicated for, providing cancellation of a UL transmission.

In some wireless communication systems, a UEs in an RRC idle or an RRC inactive state while an SDT procedure is not ongoing may monitor for SI change indication in own paging occasion every DRX cycle and UEs in RRC inactive state is ongoing may monitor for SI change indication in any paging occasion at least once per modification period, if the initial downlink BWP on which the SDT procedure is ongoing is associated with a CD-SSB. However, such monitoring may be inconsistent with PEI. For example, a UE such as a reduced capability (RedCap) UE supporting PEI based on PDCCH (or low power wake up signal) may not process (e.g., not monitor) an upcoming PO based on the PEI. Based on PEI, the UE may be allowed to skip monitoring one or multiple POs (including Short Message indicating SI change) on all DRX cycles while SDT procedure is not ongoing, or within all the SI modification periods while SDT procedure is ongoing. However, such a procedure may conflict with the configuration where the UE may monitor for SI change indication in own paging occasion every DRX cycle and monitor for SI change indication in any paging occasion at least once per modification period, if the initial downlink BWP on which the SDT procedure ongoing is associated with a CD-SSB. In addition, in some aspects, a RedCap-specific initial DL BWP on which the SDT procedure is ongoing may include CD-SSB but not the entire CORESET #0 associated with PO (e.g., Type 2-PDCCH CSS set where PDCCH common search space set is configured by pagingSearchSpace in PDCCH-ConfigCommon for a DCI format with CRC scrambled by a P-RNTI on a primary cell).

In some aspects, one or multiple PEI monitoring occasion (PEI-O) or PO associated with short message may overlap with CG-PUSCH occasion(s) of SDT. Resources for PEI-O (based on PDCCH, or sequence like LP-WUS) may be configured in the initial DL BWP for SDT. In some aspects, starting time and maximum time duration of SDT are separately configured from time offset and periodicity of PO. For example, if the SDT starts after PO n and ends before PO n+1, it may not be necessary for the UE to monitor PO for SI change indication when SDT procedure is ongoing. Aspects provided herein enables a more efficient SDT procedure by providing mechanisms that resolve inconsistency between PEI and SDT procedures, provide collision handling rules for SDT procedures where one or multiple PEI monitoring occasion (PEI-O) or PO associated with short message may overlap with CG-PUSCH occasion(s) of SDT, allows a UE to skip monitoring for POs when the SDT is ongoing, and provide resolutions for RedCap-specific initial DL BWP on which the SDT procedure is ongoing may include CD-SSB but not the entire CORESET #0 associated with PO.

As used herein, the term "SDT procedure" may refer to an SDT procedure configured with an initial DL BWP and may be MO-SDT (e.g., RA-SDT or CG-SDT), MT-SDT, or a combination of MO-SDT or MT-SDT. An SSB in the initial DL BWP may be cell defining SSB (CD-SSB) or non-cell defining SSB (NCD-SSB).

Figure 6A:
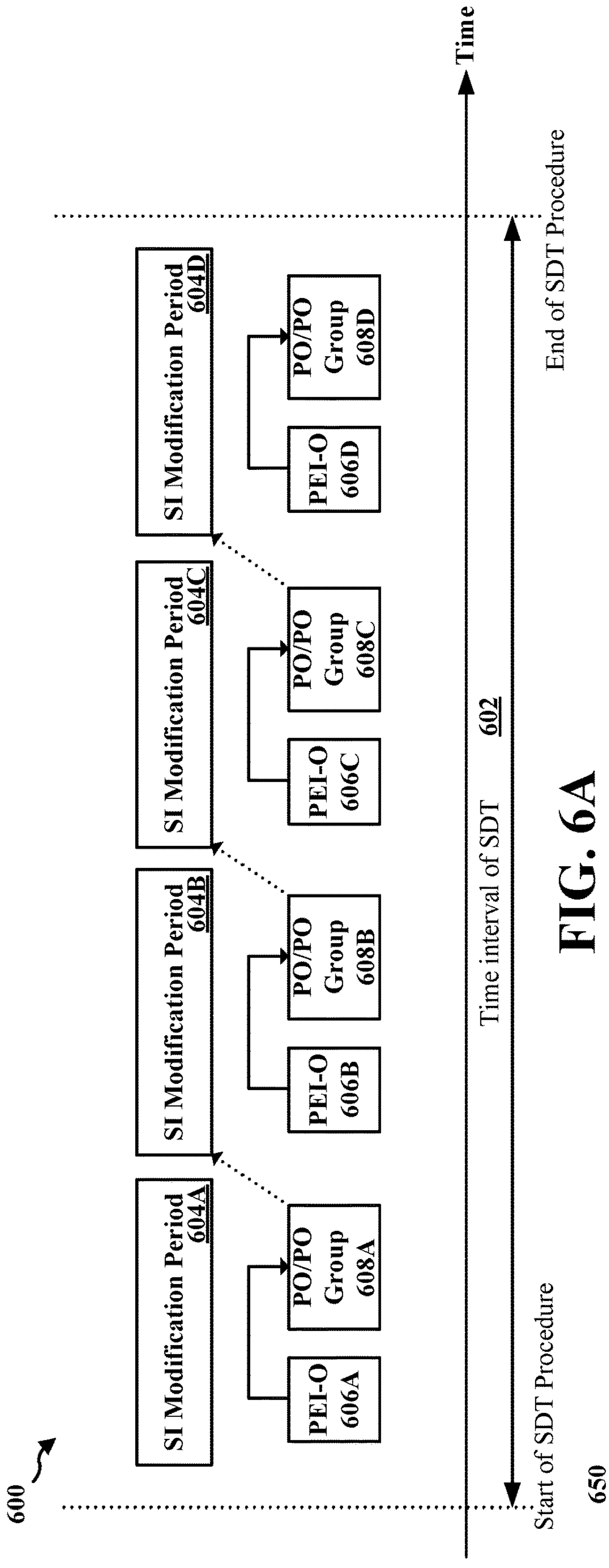
FIG. 6A is a diagram illustrating an example of SI modification in an SDT procedure, in accordance with various aspects of the present disclosure.

FIG. 6A is a diagram 600 illustrating an example of SI modification in an SDT procedure, in accordance with various aspects of the present disclosure. As illustrated in FIG. 6A, within a time interval 602 for an SDT procedure, there may be a first SI modification period 604A, a second SI modification period 604B, a third SI modification period 604C, and a fourth SI modification period 604D that overlaps with the time interval 602. The first SI modification period 604A may overlap with a PEI-O 606A and an associated PO or PO group 608A, the second SI modification period 604B may overlap with a PEI-O 606B and an associated PO or PO group 608B, the third SI modification period 604C may overlap with a PEI-O 606C and an associated PO or PO group 608C, and the fourth SI modification period 604D may overlap with a PEI-O 606D and an associated PO or PO group 608D. During each of the first SI modification period 604A, the second SI modification period 604B, the third SI modification period 604C, and the fourth SI modification period 604D, an SI change may or may not occur. In some wireless communication systems, the UE may monitor an SI change indication (e.g., in a short message) during each of first SI modification period 604A, the second SI modification period 604B, the third SI modification period 604C, and the fourth SI modification period 604D, which may conflict with the PEI monitoring. In some wireless communication systems, the UE may monitor an SI change indication (e.g., in a short message) during each of first SI modification period 604A, the second SI modification period 604B, the third SI modification period 604C, and the fourth SI modification period 604D, which may conflict with the PEI monitoring.

Figure 6B:
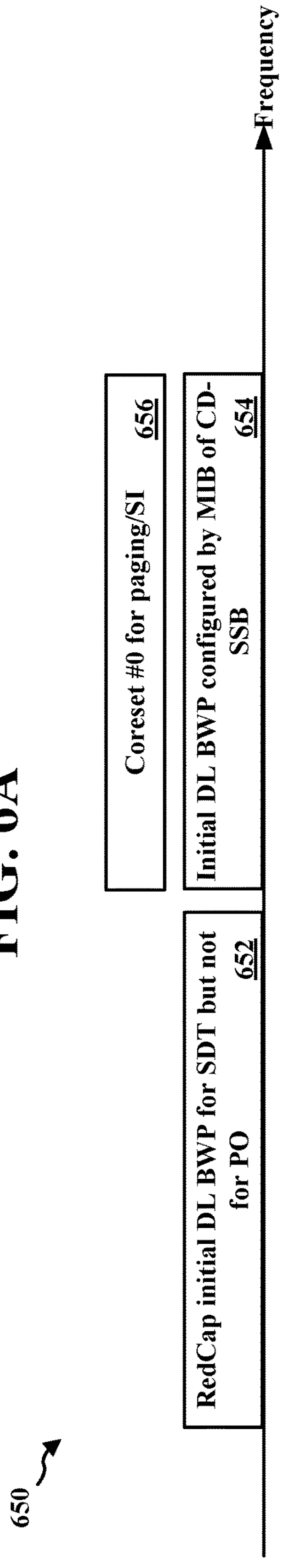
FIG. 6B is a diagram illustrating an example of BWP for an SDT procedure, in accordance with various aspects of the present disclosure.

FIG. 6B is a diagram 650 illustrating an example of SI modification in an SDT procedure, in accordance with various aspects of the present disclosure. As illustrated in FIG. 6B, for a particular UE, there may be a RedCap specific initial DL BWP 652 configured for SDT but not for PO and there may be a separate initial DL BWP 654 configured by MIB of CD-SSB that includes CORESET #0 656 for paging and SI. When the SI change does not take place and the initial DL BWP configured for SDT does not include the entire CORESET (e.g., CORESET #0) associated with PO (e.g., Type-2 PDCCH CSS set), BWP switching/RF retuning may be performed for such redundant PO monitoring, which further increases UE complexity, latency and interruption time.

Figures 7A, 7B:
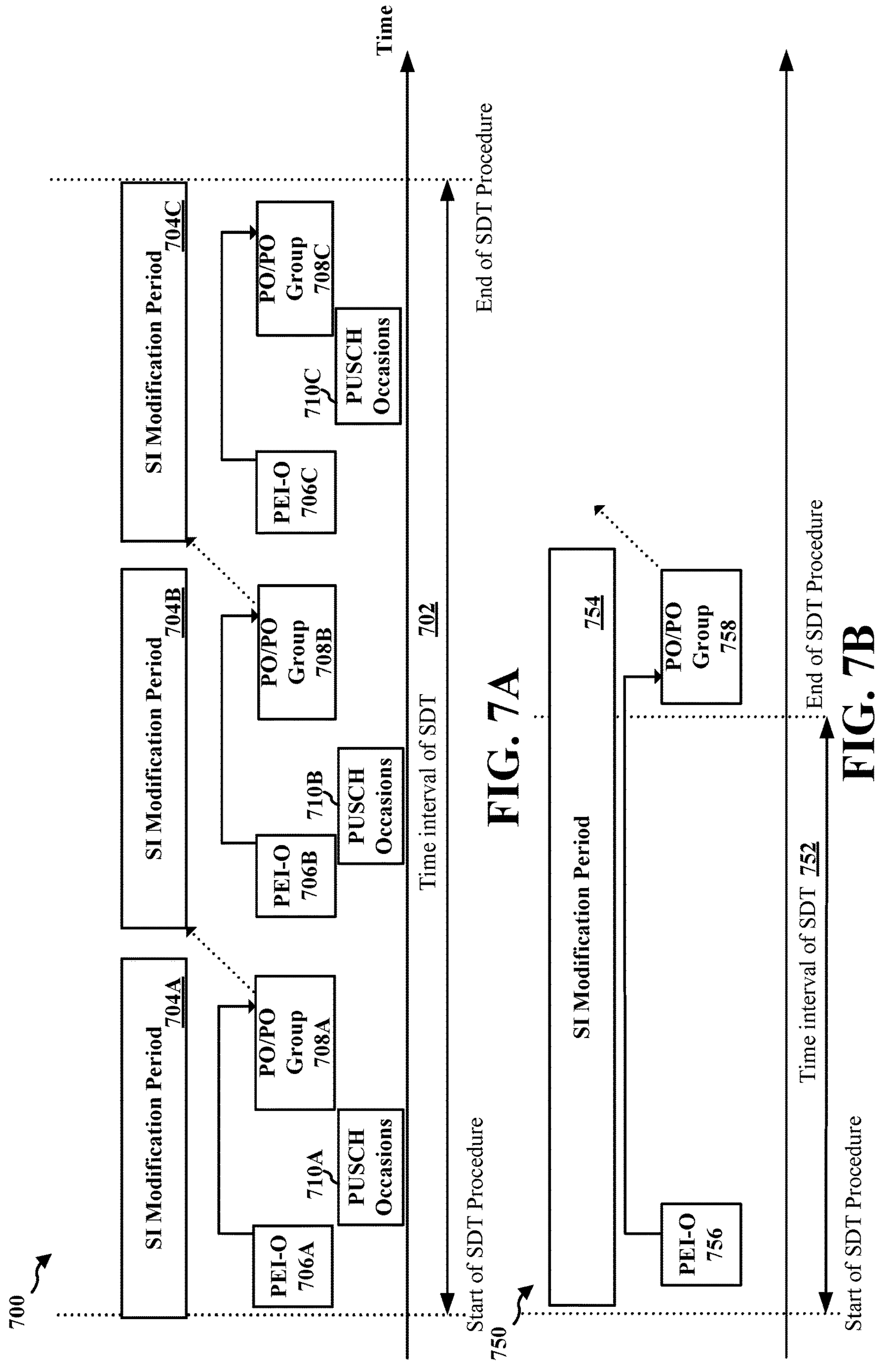
FIG. 7A is a diagram illustrating an example of SI modification in an SDT procedure, in accordance with various aspects of the present disclosure.
FIG. 7B is a diagram illustrating an example of SI modification in an SDT procedure, in accordance with various aspects of the present disclosure.

FIG. 7A is a diagram 700 illustrating an example of SI modification in an SDT procedure, in accordance with various aspects of the present disclosure. As illustrated in FIG. 7A, within a time interval 702 for an SDT procedure, there may be a first SI modification period 704A, a second SI modification period 704B, and a third SI modification period 704C that overlaps with the time interval 702. The first SI modification period 704A may overlap with a PEI-O 706A and an associated PO or PO group 708A, the second SI modification period 704B may overlap with a PEI-O 706B and an associated PO or PO group 708B, and the third SI modification period 704C may overlap with a PEI-O 706C and an associated PO or PO group 708C. A CG-PUSCH occasion 710A (e.g., PUSCH transmission occasion associated with configured grant) may overlap with the PEI-O 706A. Therefore, monitoring the PEI-O 706A may conflict with the CG-PUSCH occasion 710A. A CG-PUSCH occasion 710B (e.g., PUSCH transmission occasion associated with configured grant) may not overlap with the PEI-O 706A or the associated PO or PO group 708A. Therefore, monitoring the PEI-O 706B may not cause a conflict. A CG-PUSCH occasion 710C (e.g., PUSCH transmission occasion associated with configured grant) may overlap with the PO or PO group 708C. Therefore, monitoring the PO or PO group 708C may conflict with the CG-PUSCH occasion 710C. Each of the CG-PUSCH occasion 710A, the CG-PUSCH occasion 710B, and the CG-PUSCH occasion 710C may span one or more slots.

FIG. 7B is a diagram 750 illustrating an example of SI modification in an SDT procedure, in accordance with various aspects of the present disclosure. As illustrated in FIG. 7B, the time interval 752 of an SDT procedure of a UE may overlap with a PEI-O 756 but does not overlap with the associated PO or PO group 758. The PEI-O 756 and the PO or PO group 758 may overlap with a SI modification period 754. Monitoring the PO for SI change indication based on receiving the PEI-O 756 when the SDT procedure is ongoing may be inefficient because the PO or PO group 758 does not overlap with the time interval 752 of the SDT procedure.

Based on example aspects provided herein, if the initial DL BWP of a UE includes SSB and is configured for an SDT procedure, and the UE receives a PEI that indicates paging PDCCH is not scheduled on the next PO/PO group, the UE might not monitor for SI change indication (e.g., in short message(s)) within one or multiple SI modification periods associated with the skipped PO/PO group. For example, referring back to FIG. 6A, if a received PEI associated with PEI-O 606A indicates that paging PDCCH is not scheduled on the next PO/PO group, the UE may skip monitoring for SI change indication (e.g., in short message(s)) in the SI modification period 604A. A PEI indicating that paging PDCCH is not scheduled on the next PO/PO group may be referred to as indicating "monitoring skipping." As another example, referring back to FIG. 6A, if a received PEI associated with PEI-O 606A indicates that paging PDCCH is not scheduled on the next two PO/PO groups, the UE may skip monitoring for SI change indication (e.g., in short message(s)) in the SI modification period 604A and the SI modification period 604B. Based on example aspects provided herein, if the initial DL BWP of a UE includes SSB and is configured for SDT procedure, and the UE does not receive PEI indicating PO monitoring skipping, the UE may monitor for SI change indication in any valid PO at least once per SI modification period while the SDT procedure is ongoing. As an example, referring back to FIG. 6A, if there is no PEI received within the PEI-O 606C, the UE may monitor SI change indication (e.g., in short message(s)) in the SI modification period 604C. As another example, referring back to FIG. 6A, if there is a PEI received within the PEI-O 606C but the PEI does not indicate that paging PDCCH is not scheduled on the next PO/PO group, the UE may monitor SI change indication (e.g., in short message(s)) in the SI modification period 604D.

In some aspects, a valid PO for a UE to monitor SI change indication (e.g., in short message(s)) may satisfy all (or a subset of the four conditions in some alternative aspects) of the four following conditions: (1) being contained within the time interval that the SDT procedure is ongoing, (2) not overlapping with DL/UL transmissions with higher priority during SDT (the priority handling can be based on a set of rules configured at the UE without network signaling, configured by NW in SI or radio resource control (RRC), or dynamically indicated by downlink control information (DCI), RRC signaling, or MAC control elements (MAC CE)), (3) not indicated by PEI as monitoring skipping, if UE receives the PEI, or (4) the UE does not receive the PEI. The UE may not receive the PEI due to a variety of reasons. For example, in some aspects, the UE may not support PEI. In some aspects, the UE may not receive PEI due to PEI resources are not configured in the initial DL BWP for the SDT procedure for the UE. In some aspects, the UE may not receive PEI due to the UE not monitoring the PEI-O associated with the valid PO, as a result of NW scheduling (inter-UE), collision/priority handling (intra-UE), or UE capability (e.g., half duplex HD-FDD of RedCap UE, simultaneous monitoring of a certain number of RNTIs). In some aspects, the UE may not receive PEI due to detecting the presence of PEI but CRC check associated with the PEI failing.

Referring back to FIG. 7A, as an example, each of the CG-PUSCH occasion 710A, the CG-PUSCH occasion 710B, and the CG-PUSCH occasion 710C may have higher priority than the PEI-O or the associated PO or PO group. Therefore, in some aspects, the UE may not monitor the PO or PO group 708B within the SI modification period 704B and the PO or PO group 708C within the SI modification period 704C due to the PO or PO group or the associated PEI-O being overlapping with the CG-PUSCH occasion, rendering these PO or PO group invalid.

Referring back to FIG. 7B, as an example, in some aspects, the UE may not monitor the PO or PO group 758 due to the PO or PO group 758 being outside the time interval 752 for the SDT procedure.

Figure 8A:
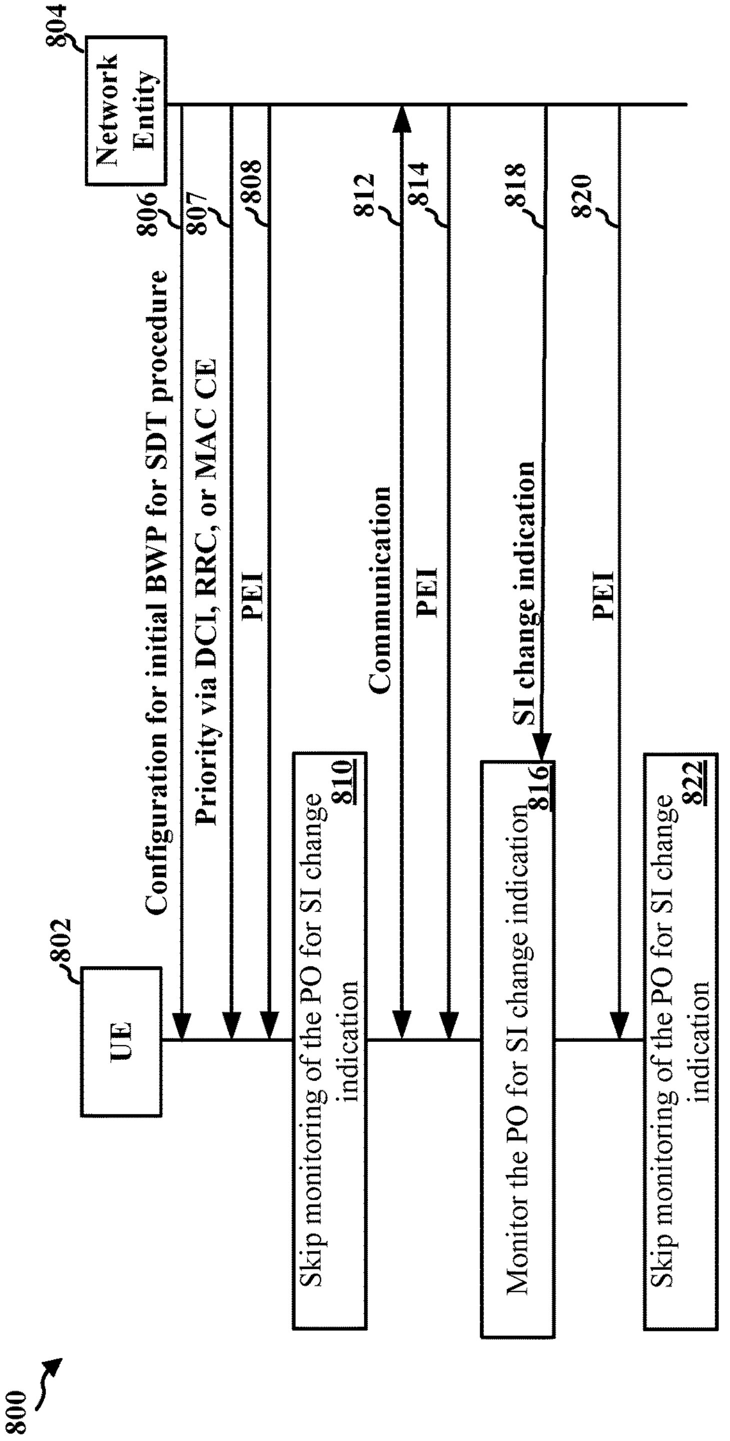
FIG. 8A is a diagram illustrating example communications between a network entity and a UE, in accordance with various aspects of the present disclosure.

FIG. 8A is a diagram 800 illustrating example communications between a network entity 804 and a UE 802 in accordance with various aspects of the present disclosure. The network entity 804 may transmit a configuration 806 for initial BWP for SDT procedure to the UE 802. During a subsequent SDT procedure and within a first SI modification period, a PEI 808 may be transmitted from the network entity 804 to the UE 802. At 810, the UE 802 may (e.g., may determine to) skip monitoring of the PO (associated with the PEI 808) for SI change indication (e.g., in short message(s)) based on the PO not being a valid PO for UE to monitor short message during SDT such as based on failing to satisfy all (or a subset of the four conditions in some alternative aspects) of the four following conditions: (1) being contained within the time interval that the SDT procedure is ongoing, (2) not overlapping with DL/UL transmissions with higher priority during SDT (the priority handling can be based on a set of rules configured at the UE without network signaling, configured by NW in SI or radio resource control (RRC), or dynamically indicated by downlink control information (DCI), RRC signaling, or MAC control elements (MAC CE)) (As an example, the priority may be provided to the UE 802 via DCI, RRC, or MAC CE at 807), (3) not indicated by PEI as monitoring skipping, if UE receives the PEI, or (4) the UE does not receive the PEI. For example, if the PEI 808 indicates that that paging PDCCH is not scheduled on the next PO/PO group, the UE 802 may skip (e.g., may determine to) skip monitoring of the PO (associated with the PEI 808) for SI change indication at 810. Accordingly, based on no SI change, the UE 802 may communicate with the network entity 804 at 812 based on the prior SI.

In some aspects, a PEI 814 may be transmitted from the network entity 804 to the UE 802. At 816, the UE 802 may (e.g., may determine to) monitor of the PO (associated with the PEI 814) for SI change indication (e.g., in short message(s)) based on the PO being a valid PO for UE to monitor short message during SDT such as based on satisfying all (or a subset of the four conditions in some alternative aspects) of the four following conditions (1) being contained within the time interval that the SDT procedure is ongoing, (2) not overlapping with DL/UL transmissions with higher priority during SDT (the priority handling can be based on a set of rules configured at the UE without network signaling, configured by NW in SI or radio resource control (RRC), or dynamically indicated by downlink control information (DCI), RRC signaling, or MAC control elements (MAC CE)), (3) not indicated by PEI as monitoring skipping, if UE receives the PEI, or (4) the UE does not receive the PEI. In some aspects, the UE 802 may receive an associated SI change indication 818 based on the monitoring. In some aspects, the SI change indication 818 may not be received even if the UE 802 monitored a PO or PO group. Within another SI modification period, a PEI 820 may be transmitted from the network entity 804 to the UE 802. At 822, the UE 802 may (e.g., may determine to) skip monitoring of the PO (associated with the PEI 820) for SI change indication (e.g., in short message(s)) based on the PO not being a valid PO for UE to monitor short message during SDT such as based on failing to satisfy all (or a subset of the four conditions in some alternative aspects) of the four following conditions: (1) being contained within the time interval that the SDT procedure is ongoing, (2) not overlapping with DL/UL transmissions with higher priority during SDT (the priority handling can be based on a set of rules configured at the UE without network signaling, configured by NW in SI or radio resource control (RRC), or dynamically indicated by downlink control information (DCI), RRC signaling, or MAC control elements (MAC CE)), (3) not indicated by PEI as monitoring skipping, if UE receives the PEI, or (4) the UE does not receive the PEI.

Figure 8B:
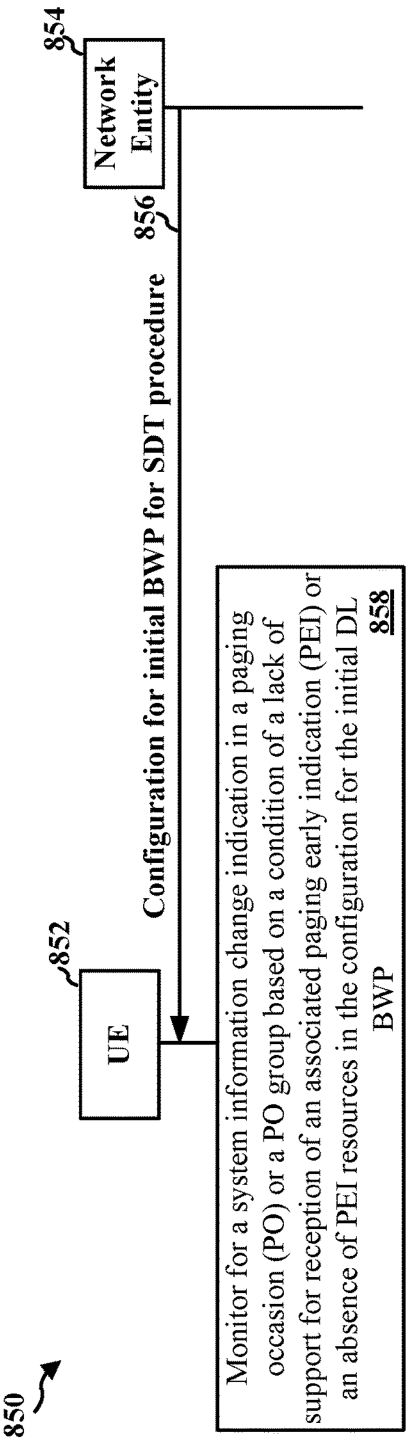
FIG. 8B is a diagram illustrating example communications between a network entity and a UE, in accordance with various aspects of the present disclosure.
Figure 9:
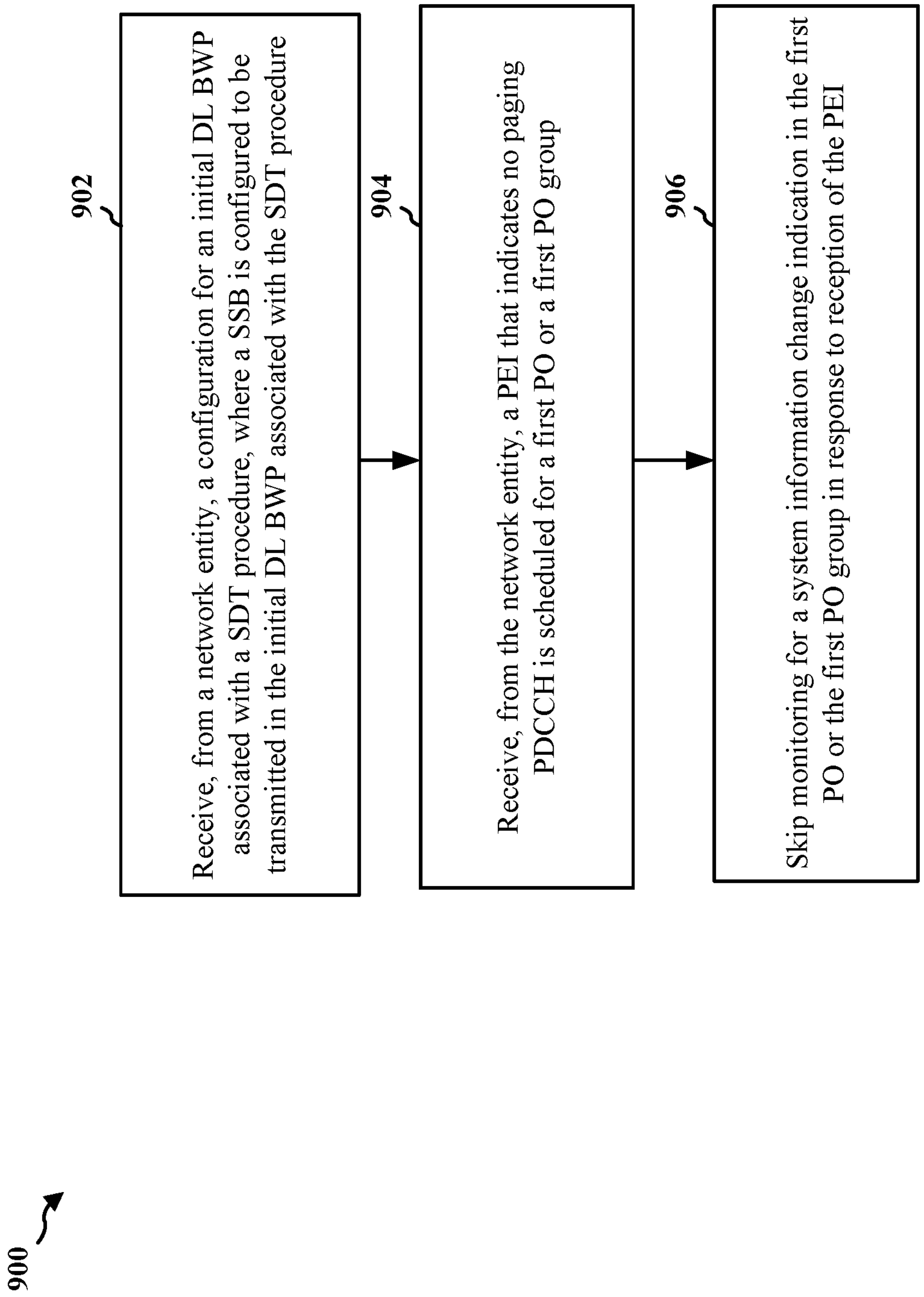
FIG. 9 is a flowchart of a method of wireless communication, in accordance with various aspects of the present disclosure.

FIG. 8B is a diagram 850 illustrating example communications between a network entity 854 and a UE 852 in accordance with various aspects of the present disclosure. The network entity 854 may transmit a configuration 856 for initial BWP for SDT procedure to the UE 852. At 858, the UE 802 may (e.g., may determine to) monitor of the PO (associated with the PEI 814) for SI change indication (e.g., in short message(s)) based on the PO not being a valid PO for UE to monitor short message during SDT such as based on satisfying all (or a subset of the four conditions in some alternative aspects) of the four following conditions (1) being contained within the time interval that the SDT procedure is ongoing, (2) not overlapping with DL/UL transmissions with higher priority during SDT (the priority handling can be based on a set of rules configured at the UE without network signaling, configured by NW in SI or radio resource control (RRC), or dynamically indicated by downlink control information (DCI), RRC signaling, or MAC control elements (MAC CE)), (3) not indicated by PEI as monitoring skipping, if UE receives the PEI, or (4) the UE does not receive the PEI. FIG. 9 is a flowchart 900 of a method of wireless communication. The method may be performed by a UE (e.g., the UE 104, the UE 802; the apparatus 1104). The method may facilitate more efficient SDT procedures.

At 902, the UE may receive, from a network entity, a configuration for an initial DL BWP associated with an SDT procedure, where a SSB is configured to be transmitted in the initial DL BWP associated with the SDT procedure. For example, the UE 802 may receive, from a network entity 804, a configuration (e.g., 806) for an initial DL BWP associated with an SDT procedure, where a SSB is configured to be transmitted in the initial DL BWP associated with the SDT procedure. In some aspects, 902 may be performed by SI component 198.

At 904, the UE may receive, from the network entity, a PEI that indicates no paging PDCCH is scheduled for a first PO or a first PO group. For example, the UE 802 may receive, from the network entity 804, a PEI (e.g., 808) that indicates no paging PDCCH is scheduled for a first PO or a first PO group. In some aspects, 904 may be performed by SI component 198.

At 906, the UE may skip monitoring for a system information change indication in the first PO or the first PO group in response to reception of the PEI. For example, the UE 802 may skip monitoring (e.g., at 810) for a system information change indication in the first PO or the first PO group in response to reception of the PEI. In some aspects, 906 may be performed by SI component 198.

Figure 10:
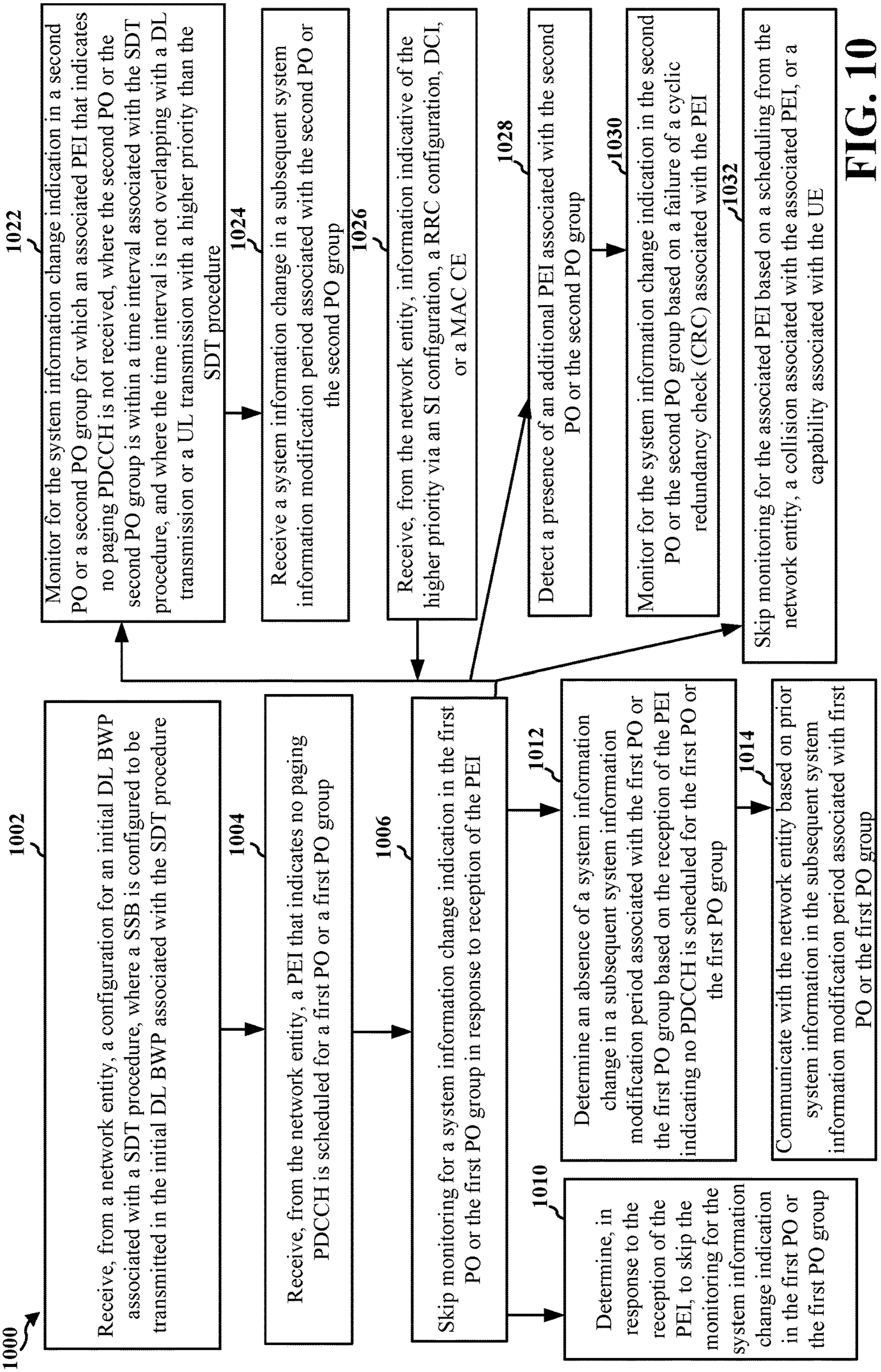
FIG. 10 is a flowchart of a method of wireless communication, in accordance with various aspects of the present disclosure.

FIG. 10 is a flowchart 1000 of a method of wireless communication. The method may be performed by a UE (e.g., the UE 104, the UE 802; the apparatus 1104).

At 1002, the UE may receive, from a network entity, a configuration for an initial DL BWP associated with an SDT procedure, where a SSB is configured to be transmitted in the initial DL BWP associated with the SDT procedure. For example, the UE 802 may receive, from a network entity 804, a configuration (e.g., 806) for an initial DL BWP associated with an SDT procedure, where a SSB is configured to be transmitted in the initial DL BWP associated with the SDT procedure. In some aspects, 1002 may be performed by SI component 198. In some aspects, the SDT procedure is a mobile originated (MO) SDT procedure or a mobile terminated (MT) SDT procedure. In some aspects, the SSB is a cell defining (CD) SSB or a non-cell defining (NCD) SSB. In some aspects, the system information change indication is included in a short message.

At 1004, the UE may receive, from the network entity, a PEI that indicates no paging PDCCH is scheduled for a first PO or a first PO group. For example, the UE 802 may receive, from the network entity 804, a PEI (e.g., 808) that indicates no paging PDCCH is scheduled for a first PO or a first PO group. In some aspects, 1004 may be performed by SI component 198.

At 1006, the UE may skip monitoring for a system information change indication in the first PO or the first PO group in response to reception of the PEI. For example, the UE 802 may skip monitoring (e.g., at 810) for a system information change indication in the first PO or the first PO group in response to reception of the PEI. In some aspects, 1006 may be performed by SI component 198.

At 1010, the UE may determine, in response to the reception of the PEI, to skip the monitoring for the system information change indication in the first PO or the first PO group. For example, the UE 802 may determine, in response to the reception of the PEI, to skip the monitoring for the system information change indication in the first PO or the first PO group. In some aspects, 1010 may be performed by SI component 198.

At 1012, the UE may determine an absence of a system information change in a subsequent system information modification period associated with the first PO or the first PO group based on the reception of the PEI indicating no PDCCH is scheduled for the first PO or the first PO group. For example, the UE 802 may determine an absence of a system information change in a subsequent system information modification period associated with the first PO or the first PO group based on the reception of the PEI indicating no PDCCH is scheduled for the first PO or the first PO group. In some aspects, 1012 may be performed by SI component 198.

At 1014, the UE may communicate with the network entity based on prior system information in the subsequent system information modification period associated with first PO or the first PO group. For example, the UE 802 may communicate with the network entity 804 (e.g., at 812) based on prior system information in the subsequent system information modification period associated with first PO or the first PO group. In some aspects, 1014 may be performed by SI component 198.

At 1022, the UE may monitor for the system information change indication in a second PO or a second PO group for which an associated PEI that indicates no paging PDCCH is not received, where the second PO or the second PO group is within a time interval associated with the SDT procedure, and where the time interval is not overlapping with a DL transmission or a UL transmission with a higher priority than the SDT procedure. For example, the UE 802 may monitor (e.g., at 816) for the system information change indication in a second PO or a second PO group for which an associated PEI that indicates no paging PDCCH is not received, where the second PO or the second PO group is within a time interval associated with the SDT procedure, and where the time interval is not overlapping with a DL transmission or a UL transmission with a higher priority than the SDT procedure. In some aspects, 1022 may be performed by SI component 198.

At 1024, the UE may receive a system information change in a subsequent system information modification period associated with the second PO or the second PO group. For example, the UE 802 may receive a system information change (e.g., 818) in a subsequent system information modification period associated with the second PO or the second PO group. In some aspects, 1024 may be performed by SI component 198.

At 1026, the UE may receive, from the network entity, information indicative of the higher priority via an SI configuration, a RRC configuration, DCI, or a MAC CE. For example, the UE 802 may receive, from the network entity, information (e.g., 807) indicative of the higher priority via an SI configuration, a RRC configuration, DCI, or a MAC CE. In some aspects, 1026 may be performed by SI component 198.

At 1028, the UE may detect a presence of an additional PEI associated with the second PO or the second PO group. For example, the UE 802 may detect a presence of an additional PEI (e.g., 814) associated with the second PO or the second PO group. In some aspects, 1028 may be performed by SI component 198.

At 1030, the UE may monitor for the system information change indication in the second PO or the second PO group based on a failure of a cyclic redundancy check (CRC) associated with the PEI. For example, the UE 802 may monitor for the system information change indication in the second PO or the second PO group based on a failure of a cyclic redundancy check (CRC) associated with the PEI. In some aspects, 1030 may be performed by SI component 198.

At 1032, the UE may skip monitoring for the associated PEI based on a scheduling from the network entity, a collision associated with the associated PEI, or a capability associated with the UE. For example, the UE 802 may skip monitoring for the associated PEI based on a scheduling from the network entity, a collision associated with the associated PEI, or a capability associated with the UE. In some aspects, 1032 may be performed by SI component 198.

In some aspects, a valid PO or a valid PO group to monitor for the system information change indication meets a condition based on at least one of: the valid PO or the valid PO group is contained within the time interval for the SDT procedure, the valid PO or the valid PO group does not overlap with a higher priority downlink transmission or a higher priority uplink transmission, a first absence of a PO monitoring skipping PEI, a lack of support for the reception of the PEI associated with the valid PO or the valid PO group, a second absence of PEI resources in the configuration for the initial DL BWP associated with the valid PO or the valid PO group, or a skipped monitoring occasion for the PEI associated with the valid PO or the valid PO group.

In some aspects, the UE may skip monitoring for the system information change indication in a third PO or a third PO group, where which an associated PEI that indicates no paging PDCCH is received, where the third PO or the third PO group is not within a time interval associated with the SDT procedure, or where the time interval is overlapping with a DL transmission or a UL transmission with a higher priority than the SDT procedure.

Figure 11:
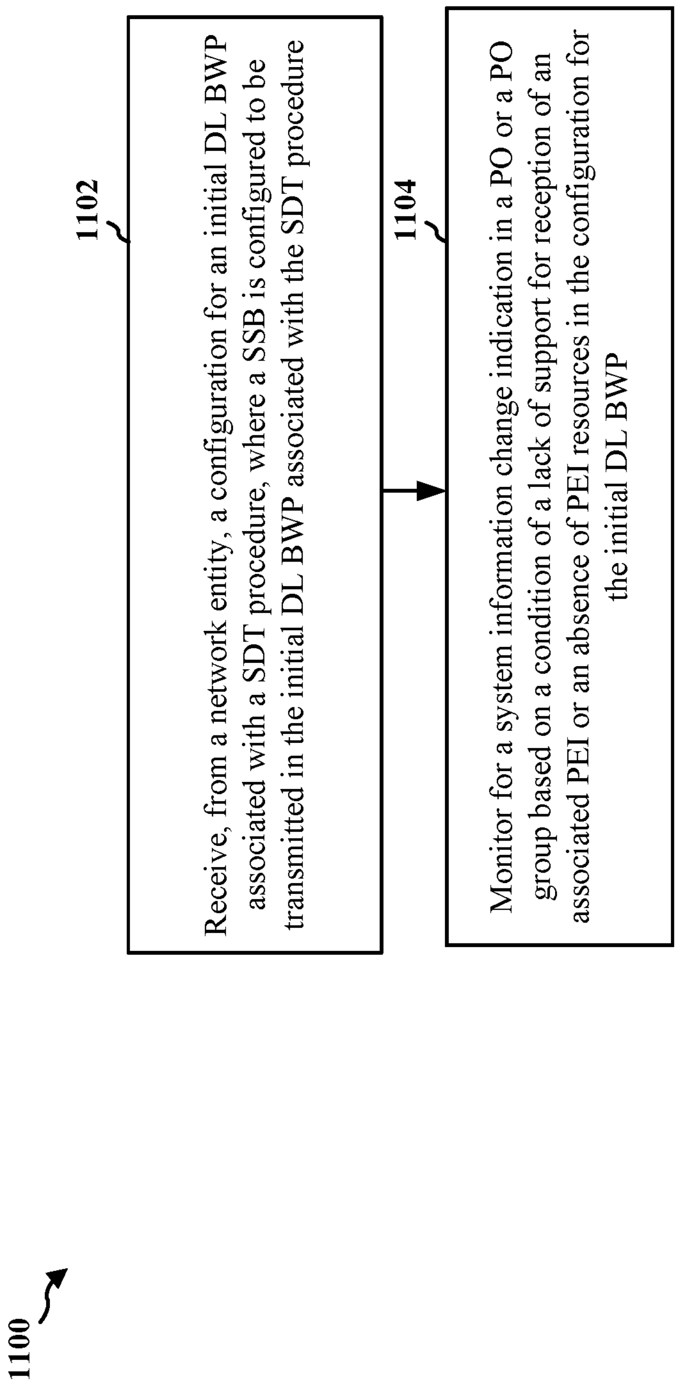
FIG. 11 is a flowchart of a method of wireless communication, in accordance with various aspects of the present disclosure.

FIG. 11 is a flowchart 1100 of a method of wireless communication. The method may be performed by a UE (e.g., the UE 104, the UE 852; the apparatus 1104).

At 1102, the UE may receive, from a network entity, a configuration for an initial DL BWP associated with an SDT procedure, where a SSB is configured to be transmitted in the initial DL BWP associated with the SDT procedure. For example, the UE 852 may receive, from a network entity 854, a configuration for an initial DL BWP associated with an SDT procedure (e.g., 856), where a SSB is configured to be transmitted in the initial DL BWP associated with the SDT procedure. In some aspects, 1102 may be performed by SI component 198.

At 1104, the UE may monitor for a system information change indication in a PO or a PO group based on a condition of a lack of support for reception of an associated PEI or an absence of PEI resources in the configuration for the initial DL BWP. For example, the UE 852 may monitor (e.g., at 858) for a system information change indication in a PO or a PO group based on a condition of a lack of support for reception of an associated PEI or an absence of PEI resources in the configuration for the initial DL BWP. In some aspects, 1104 may be performed by SI component 198. In some aspects, the condition is the lack of support for the reception of the associated PEI. In some aspects, the condition is the absence of the PEI resources in the configuration for the initial DL BWP. In some aspects, the system information change indication is included in a short message.

Figure 12:
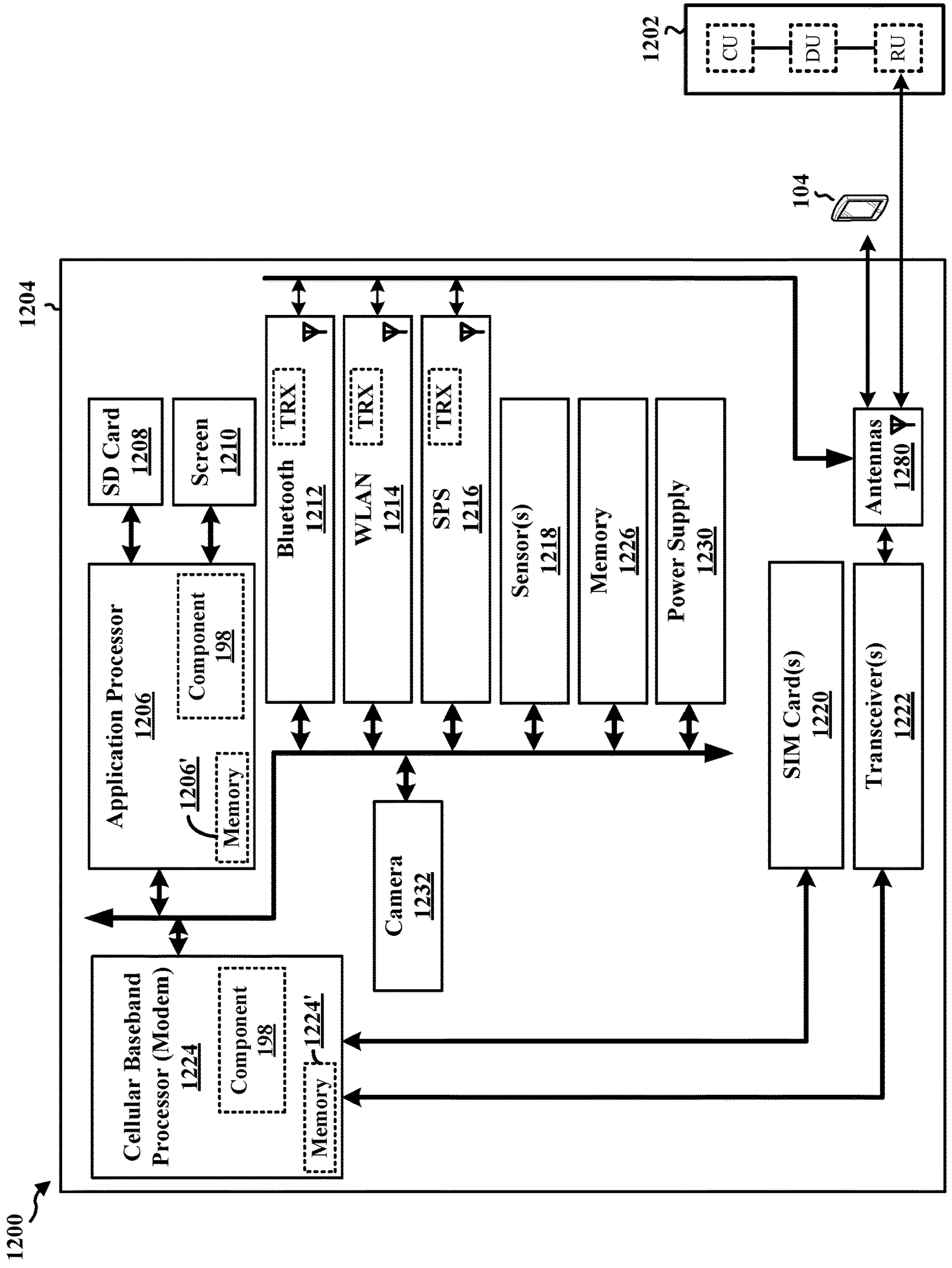
FIG. 12 is a diagram illustrating an example of a hardware implementation for an example apparatus and/or network entity, in accordance with various aspects of the present disclosure.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include at least one cellular baseband processor 1224 (also referred to as a modem) coupled to one or more transceivers 1222 (e.g., cellular RF transceiver). The cellular baseband processor(s) 1224 may include at least one on-chip memory 1224'. In some aspects, the apparatus 1204 may further include one or more subscriber identity modules (SIM) cards 1220 and at least one application processor 1206 coupled to a secure digital (SD) card 1208 and a screen 1210. The application processor(s) 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor(s) 1224 communicates through the transceiver(s) 1222 via one or more antennas 1280 with the UE 104 and/or with an RU associated with a network entity 1202. The cellular baseband processor(s) 1224 and the application processor(s) 1206 may each include a computer-readable medium/memory 1224',1206', respectively. The additional memory modules 1226 may also be considered a computer-readable medium/memory. Each computer-readable medium/memory 1224',1206',1226 may be non-transitory. The cellular baseband processor(s) 1224 and the application processor(s) 1206 are each responsible for general processing, including the execution of software stored on the computer-readable medium/memory. The software, when executed by the cellular baseband processor(s) 1224/application processor(s) 1206, causes the cellular baseband processor(s) 1224/application processor(s) 1206 to perform the various functions described supra. The computer-readable medium/memory may also be used for storing data that is manipulated by the cellular baseband processor(s) 1224/application processor(s) 1206 when executing software. The cellular baseband processor(s) 1224/application processor(s) 1206 may be a component of the UE 350 and may include the at least one memory 360 and/or at least one of the TX processor 368, the RX processor 356, and the controller/processor 359. In some aspects, the apparatus 1204 may be at least one processor chip (modem and/or application) and include just the cellular baseband processor(s) 1224 and/or the application processor(s) 1206, and in another configuration, the apparatus 1204 may be the entire UE (e.g., see UE 350 of FIG. 3) and include the additional modules of the apparatus 1204.

As discussed supra, the SI component 198 may be configured to receive, from a network entity, a configuration for an initial DL BWP associated with an SDT procedure, where a SSB is configured to be transmitted in the initial DL BWP associated with the SDT procedure. In some aspects, the SI component 198 may be further configured to receive, from the network entity, a PEI that indicates no paging PDCCH is scheduled for a first PO or a first PO group. In some aspects, the SI component 198 may be further configured to skip monitoring for a system information change indication in the first PO or the first PO group in response to reception of the PEI. The SI component 198 may be within the cellular baseband processor(s) 1224, the application processor(s) 1206, or both the cellular baseband processor(s) 1224 and the application processor(s) 1206. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1204 may include a variety of components configured for various functions. In some aspects, the apparatus 1204, and in particular the cellular baseband processor(s) 1224 and/or the application processor(s) 1206, may include means for receiving, from a network entity, a configuration for an initial DL BWP associated with an SDT procedure, where a SSB is configured to be transmitted in the initial DL BWP associated with the SDT procedure. In some aspects, the apparatus 1204 may include means for receiving, from the network entity, a PEI that indicates no paging PDCCH is scheduled for a first PO or a first PO group. In some aspects, the apparatus 1204 may include means for skipping monitoring for a system information change indication in the first PO or the first PO group in response to reception of the PEI. In some aspects, the apparatus 1204 may include means for determining, in response to the reception of the PEI, to skip the monitoring for the system information change indication in the first PO or the first PO group. In some aspects, the apparatus 1204 may include means for determining an absence of a system information change in a subsequent system information modification period associated with the first PO or the first PO group based on the reception of the PEI indicating no PDCCH is scheduled for the first PO or the first PO group. In some aspects, the apparatus 1204 may include means for communicating with the network entity based on prior system information in the subsequent system information modification period associated with first PO or the first PO group. In some aspects, the apparatus 1204 may include means for monitoring for the system information change indication in a second PO or a second PO group for which an associated PEI that indicates no paging PDCCH is not received, where the second PO or the second PO group is within a time interval associated with the SDT procedure, and where the time interval is not overlapping with a DL transmission or a uplink (UL) transmission with a higher priority than the SDT procedure. In some aspects, the apparatus 1204 may include means for receiving a system information change in a subsequent system information modification period associated with the second PO or the second PO group. In some aspects, the apparatus 1204 may include means for receiving, from the network entity, information indicative of the higher priority via a system information configuration, a radio resource control (RRC) configuration, downlink control information (DCI), or a medium access control (MAC) control element (MAC CE). In some aspects, the apparatus 1204 may include means for detecting a presence of an additional PEI associated with the second PO or the second PO group. In some aspects, the apparatus 1204 may include means for monitoring for the system information change indication in the second PO or the second PO group based on a failure of a cyclic redundancy check (CRC) associated with the PEI. In some aspects, the apparatus 1204 may include means for skipping monitoring for the associated PEI based on a scheduling from the network entity, a collision associated with the associated PEI, or a capability associated with the UE. In some aspects, the apparatus 1204 may include means for skipping monitoring for the system information change indication in a third PO or a third PO group, where which an associated PEI that indicates no paging PDCCH is received, where the third PO or the third PO group is not within a time interval associated with the SDT procedure, or where the time interval is overlapping with a DL transmission or a uplink (UL) transmission with a higher priority than the SDT procedure.

In some aspects, the apparatus 1204, and in particular the cellular baseband processor(s) 1224 and/or the application processor(s) 1206, may include means for receiving, from a network entity, a configuration for an initial DL BWP associated with an SDT procedure, where a SSB is configured to be transmitted in the initial DL BWP associated with the SDT procedure. In some aspects, the apparatus 1204 may include means for monitoring for a system information change indication in a PO or a PO group based on a condition of a lack of support for reception of an associated PEI or an absence of PEI resources in the configuration for the initial DL BWP.

The means may be the component 198 of the apparatus 1204 configured to perform the functions recited by the means. As described supra, the apparatus 1204 may include the TX processor 368, the RX processor 356, and the controller/processor 359. As such, in some aspects, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is an method for wireless communication at a user equipment (UE), including: receiving, from a network entity, a configuration for an initial downlink (DL) bandwidth part (BWP) associated with a small data transmission (SDT) procedure, where a synchronization signal block (SSB) is configured to be transmitted in the initial DL BWP associated with the SDT procedure; receiving, from the network entity, a paging early indication (PEI) that indicates no paging physical downlink control channel (PDCCH) is scheduled for a first paging occasion (PO) or a first PO group; and skipping monitoring for a system information change indication in the first PO or the first PO group in response to reception of the PEI.

Aspect 2 is the method of aspect 1, further including: determining, in response to the reception of the PEI, to skip the monitoring for the system information change indication in the first PO or the first PO group.

Aspect 3 is the method of any of aspects 1-2, further including: determining an absence of a system information change in a subsequent system information modification period associated with the first PO or the first PO group based on the reception of the PEI indicating no PDCCH is scheduled for the first PO or the first PO group; and communicating with the network entity based on prior system information in the subsequent system information modification period associated with first PO or the first PO group.

Aspect 4 is the method of any of aspects 1-3, further including: monitoring for the system information change indication in a second PO or a second PO group for which an associated PEI that indicates no paging PDCCH is not received, where the second PO or the second PO group is within a time interval associated with the SDT procedure, and where the time interval is not overlapping with a DL transmission or a uplink (UL) transmission with a higher priority than the SDT procedure.

Aspect 5 is the method of aspect 4, further including: receiving a system information change in a subsequent system information modification period associated with the second PO or the second PO group.

Aspect 6 is the method of any of aspects 4-5, further including: receiving, from the network entity, information indicative of the higher priority via a system information (SI) configuration, a radio resource control (RRC) configuration, downlink control information (DCI), or a medium access control (MAC) control element (MAC CE).

Aspect 7 is the method of any of aspects 4-6, where the second PO or the second PO group is associated with an additional PEI that indicates paging PDCCH for the UE.

Aspect 8 is the method of any of aspects 4-7, further including: detecting a presence of an additional PEI associated with the second PO or the second PO group; and monitoring for the system information change indication in the second PO or the second PO group based on a failure of a cyclic redundancy check (CRC) associated with the PEI.

Aspect 9 is the method of aspect 4, further including: skipping monitoring for the associated PEI based on a scheduling from the network entity, a collision associated with the associated PEI, or a capability associated with the UE.

Aspect 10 is the method of aspect 9, wherein the capability indicates half duplex (HD), and the method further includes skipping monitoring for the associated PEI based on the capability indicating the HD.

Aspect 11 is the method of any of aspects 1-10, where a valid PO or a valid PO group to monitor for the system information change indication meets a condition based on at least one of: the valid PO or the valid PO group is contained within the time interval for the SDT procedure, the valid PO or the valid PO group does not overlap with a higher priority downlink transmission or a higher priority uplink transmission, a first absence of a PO monitoring skipping PEI, a lack of support for the reception of the PEI associated with the valid PO or the valid PO group, a second absence of PEI resources in the configuration for the initial DL BWP associated with the valid PO or the valid PO group, or a skipped monitoring occasion for the PEI associated with the valid PO or the valid PO group.

Aspect 12 is the method of any of aspects 1-11, further including: skipping monitoring for the system information change indication in a third PO or a third PO group, where which an associated PEI that indicates no paging PDCCH is received, where the third PO or the third PO group is not within a time interval associated with the SDT procedure, or where the time interval is overlapping with a DL transmission or a uplink (UL) transmission with a higher priority than the SDT procedure.

Aspect 13 is the method of any of aspects 1-12, where the SDT procedure is a mobile originated (MO) SDT procedure or a mobile terminated (MT) SDT procedure.

Aspect 14 is the method of any of aspects 1-13, where the SSB is a cell defining (CD) SSB or a non-cell defining (NCD) SSB.

Aspect 15 is the method of any of aspects 1-14, where the system information change indication is included in a short message.

Aspect 16 is an method for wireless communication at a user equipment (UE), including: receiving, from a network entity, a configuration for an initial downlink (DL) bandwidth part (BWP) associated with a small data transmission (SDT) procedure, where a synchronization signal block (SSB) is configured to be transmitted in the initial DL BWP associated with the SDT procedure; and monitoring for a system information change indication in a paging occasion (PO) or a PO group based on a condition of a lack of support for reception of an associated paging early indication (PEI) or an absence of PEI resources in the configuration for the initial DL BWP.

Aspect 17 is the method of aspect 16, where the condition is the lack of support for the reception of the associated PEI.

Aspect 18 is the method of aspect 16, where the condition is the absence of the PEI resources in the configuration for the initial DL BWP.

Aspect 19 is the method of any of aspects 16-18, where the system information change indication is included in a short message.

Aspect 20 is an apparatus for wireless communication at a device including at least one memory and at least one processor coupled to the at least one memory and, based at least in part on information stored in the at least one memory, the at least one processor is configured, individually or in combination, to implement any of aspects 1 to 15.

Aspect 21 is the apparatus of aspect 19, further including one or more transceivers or one or more antennas coupled to the at least one processor.

Aspect 22 is an apparatus for wireless communication at a device including means for implementing any of aspects 1 to 15.

Aspect 23 is a computer-readable medium (e.g., a non-transitory computer-readable medium) storing computer executable code, where the code when executed by at least one processor causes the at least one processor to implement any of aspects 1 to 15.

Aspect 24 is an apparatus for wireless communication at a device including at least one memory and at least one processor coupled to the at least one memory and, based at least in part on information stored in the at least one memory, the at least one processor is configured, individually or in combination, to implement any of aspects 16 to 19.

Aspect 25 is the apparatus of aspect 23, further including one or more transceivers or one or more antennas coupled to the at least one processor.

Aspect 26 is an apparatus for wireless communication at a device including means for implementing any of aspects 16 to 19.

Aspect 27 is a computer-readable medium (e.g., a non-transitory computer-readable medium) storing computer executable code, where the code when executed by at least one processor causes the at least one processor to implement any of aspects 16 to 19.

What is claimed is:

1. An apparatus for wireless communication at a user equipment (UE), comprising:

at least one memory; and at least one processor coupled to the at least one memory and, based at least in part on stored information that is stored in the at least one memory, the at least one processor is configured to cause the apparatus to:

receive, from a network entity, a configuration for an initial downlink (DL) bandwidth part (BWP) associated with a small data transmission (SDT) procedure, wherein a synchronization signal block (SSB) is configured to be transmitted in the initial DL BWP associated with the SDT procedure;

receive, from the network entity, a paging early indication (PEI) that indicates no paging physical downlink control channel (PDCCH) is scheduled for a first paging occasion (PO) or a first PO group; and skip monitoring for a system information change indication in the first PO or the first PO group in response to reception of the PEI and monitor for the system information change indication at least once per system information modification period while the SDT procedure is ongoing.

2. The apparatus of claim 1, wherein the at least one processor is configured to cause the apparatus to:

determine, in response to the reception of the PEI, to skip the monitoring for the system information change indication in the first PO or the first PO group.

3. The apparatus of claim 1, wherein the at least one processor is configured to cause the apparatus to:

determine an absence of a system information change in a subsequent system information modification period associated with the first PO or the first PO group based on the reception of the PEI indicating no PDCCH is scheduled for the first PO or the first PO group; and communicate with the network entity based on prior system information in the subsequent system information modification period associated with first PO or the first PO group.

4. The apparatus of claim 1, wherein the at least one processor is configured to cause the apparatus to:

monitor for the system information change indication in a second PO or a second PO group for which an associated PEI that indicates no paging PDCCH is not received, wherein the second PO or the second PO group is within a time interval associated with the SDT procedure, and wherein the time interval is not overlapping with a DL transmission or a uplink (UL) transmission with a higher priority than the SDT procedure.

5. The apparatus of claim 4, wherein the at least one processor is configured to cause the apparatus to:

receive, from the network entity, information indicative of the higher priority via a system information (SI) configuration, a radio resource control (RRC) configuration, downlink control information (DCI), or a medium access control (MAC) control element (MAC CE).

6. The apparatus of claim 4, wherein the at least one processor is configured to cause the apparatus to:

detect a presence of an additional PEI associated with the second PO or the second PO group; and monitor for the system information change indication in the second PO or the second PO group based on a failure of a cyclic redundancy check (CRC) associated with the PEI.

7. The apparatus of claim 4, wherein the at least one processor is configured to cause the apparatus to:

skip monitoring for the associated PEI based on a scheduling from the network entity, a collision associated with the associated PEI, or a capability associated with the UE.

8. The apparatus of claim 7, wherein the capability indicates half duplex (HD), and wherein the at least one processor is configured to cause the apparatus to:

skip monitoring for the associated PEI based on the capability indicating the HD.

9. The apparatus of claim 4, wherein a valid PO or a valid PO group to monitor for the system information change indication meets a condition based on at least one of:

the valid PO or the valid PO group is contained within the time interval for the SDT procedure, the valid PO or the valid PO group does not overlap with a higher priority downlink transmission or a higher priority uplink transmission, a first absence of a PO monitoring skipping PEI, a lack of support for the reception of the PEI associated with the valid PO or the valid PO group, a second absence of PEI resources in the configuration for the initial DL BWP associated with the valid PO or the valid PO group, or a skipped monitoring occasion for the PEI associated with the valid PO or the valid PO group.

10. The apparatus of claim 1, wherein the at least one processor is configured to cause the apparatus to:

skip monitoring for the system information change indication in a third PO or a third PO group, wherein which an associated PEI that indicates no paging PDCCH is received, wherein the third PO or the third PO group is not within a time interval associated with the SDT procedure, or wherein the time interval is overlapping with a DL transmission or a uplink (UL) transmission with a higher priority than the SDT procedure.

11. An apparatus for wireless communication at a user equipment (UE), comprising:

at least one memory; and at least one processor coupled to the at least one memory and, based at least in part on stored information that is stored in the at least one memory, the at least one processor is configured to cause the apparatus to:

receive, from a network entity, a configuration for an initial downlink (DL) bandwidth part (BWP) associated with a small data transmission (SDT) procedure, wherein a synchronization signal block (SSB) is configured to be transmitted in the initial DL BWP associated with the SDT procedure; and monitor for a system information change indication in a paging occasion (PO) or a PO group based on a condition of a lack of support for reception of an associated paging early indication (PEI) or an absence of PEI resources in the configuration for the initial DL BWP and at least once per system information modification period while the SDT procedure is ongoing.

12. A method for wireless communication at a user equipment (UE), comprising:

receiving, from a network entity, a configuration for an initial downlink (DL) bandwidth part (BWP) associated with a small data transmission (SDT) procedure, wherein a synchronization signal block (SSB) is configured to be transmitted in the initial DL BWP associated with the SDT procedure;

receiving, from the network entity, a paging early indication (PEI) that indicates no paging physical downlink control channel (PDCCH) is scheduled for a first paging occasion (PO) or a first PO group; and skipping monitoring for a system information change indication in the first PO or the first PO group in response to reception of the PEI and monitoring for the system information change indication at least once per system information modification period while the SDT procedure is ongoing.

13. The method of claim 12, further comprising:

determining, in response to the reception of the PEI, to skip the monitoring for the system information change indication in the first PO or the first PO group.

14. The method of claim 12, further comprising:

determining an absence of a system information change in a subsequent system information modification period associated with the first PO or the first PO group based on the reception of the PEI indicating no PDCCH is scheduled for the first PO or the first PO group; and communicating with the network entity based on prior system information in the subsequent system information modification period associated with first PO or the first PO group.

15. The method of claim 12, further comprising:

monitoring for the system information change indication in a second PO or a second PO group for which an associated PEI that indicates no paging PDCCH is not received, wherein the second PO or the second PO group is within a time interval associated with the SDT procedure, and wherein the time interval is not overlapping with a DL transmission or a uplink (UL) transmission with a higher priority than the SDT procedure.

16. The method of claim 15, further comprising:

receiving, from the network entity, information indicative of the higher priority via a system information (SI) configuration, a radio resource control (RRC) configuration, downlink control information (DCI), or a medium access control (MAC) control element (MAC CE).

17. The method of claim 15, further comprising:

detecting a presence of an additional PEI associated with the second PO or the second PO group; and monitoring for the system information change indication in the second PO or the second PO group based on a failure of a cyclic redundancy check (CRC) associated with the PEI.

18. The method of claim 15, further comprising:

skipping monitoring for the associated PEI based on a scheduling from the network entity, a collision associated with the associated PEI, or a capability associated with the UE.

19. The method of claim 18, wherein the capability indicates half duplex (HD), further comprising:

skipping monitoring for the associated PEI based on the capability indicating the HD.

20. The method of claim 15, wherein a valid PO or a valid PO group to monitor for the system information change indication meets a condition based on at least one of:

the valid PO or the valid PO group is contained within the time interval for the SDT procedure, the valid PO or the valid PO group does not overlap with a higher priority downlink transmission or a higher priority uplink transmission, a first absence of a PO monitoring skipping PEI, a lack of support for the reception of the PEI associated with the valid PO or the valid PO group, a second absence of PEI resources in the configuration for the initial DL BWP associated with the valid PO or the valid PO group, or a skipped monitoring occasion for the PEI associated with the valid PO or the valid PO group.

* * * * *